(12) United States Patent
Radwin et al.

(10) Patent No.: US 10,810,414 B2
(45) Date of Patent: Oct. 20, 2020

(54) MOVEMENT MONITORING SYSTEM

(71) Applicant: WISCONSIN ALUMNI RESEARCH FOUNDATION, Madison, WI (US)

(72) Inventors: Robert Radwin, Waunakee, WI (US); Xuan Wang, Madison, WI (US); Yu Hen Hu, Middleton, WI (US); Nicholas Difranco, Naperville, IL (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 25 days.

(21) Appl. No.: 16/038,664

(22) Filed: Jul. 18, 2018

(65) Prior Publication Data

US 2019/0012531 A1 Jan. 10, 2019

Related U.S. Application Data

(63) Continuation-in-part of application No. 15/727,283, filed on Oct. 6, 2017, now Pat. No. 10,482,613.
(Continued)

(51) Int. Cl.
*G06K 9/00* (2006.01)
*G06T 7/246* (2017.01)
*G06T 7/73* (2017.01)

(52) U.S. Cl.
CPC ..... *G06K 9/00342* (2013.01); *G06K 9/00369* (2013.01); *G06K 9/00771* (2013.01);
(Continued)

(58) Field of Classification Search
CPC ........... G06K 9/00342; G06K 9/00771; G06K 9/00369; G06T 2207/30196;
(Continued)

(56) References Cited

U.S. PATENT DOCUMENTS 5,521,841 A 5/1996 Arman et al.
5,708,767 A 1/1998 Yeo et al.
(Continued)

FOREIGN PATENT DOCUMENTS

EP 1259076 A2 11/2002
EP 1403817 A1 3/2004
(Continued)

OTHER PUBLICATIONS

Babapour et al ("Adoption of ergonomic features in a new reach truck cabin design—a usability study", Chalmers University of Technology, SE-412 96 Gothenburg, Sweden, 2012—IOS Press and the authors, pp. 1486-1492) (Year: 212).*
(Continued)

*Primary Examiner* — Amara Abdi
(74) *Attorney, Agent, or Firm* — Seager, Tufte & Wickhem LLP

(57) ABSTRACT

A monitoring system or tracking system may include an input port and a controller in communication with the input port. The input port may receive video from an image capturing device. The image capturing device is optionally part of the monitoring system and in some cases includes at least part of the controller. The controller may be configured to receive video via the input port and identify a subject within frames of the video relative to a background within the frames. Further, the controller may be configured to identify dimensions, posture, hand location, feet location, and/or other parameters of the identified subject in frames of the video and determine when the subject is performing a task. Based on the dimensions and/or other parameters identified or extracted from the video during the predetermined task, the controller may output via the output port assessment information.

22 Claims, 21 Drawing Sheets

Related U.S. Application Data

(60) Provisional application No. 62/529,440, filed on Jul. 6, 2017.

(52) U.S. Cl.
CPC .............. *G06T 7/246* (2017.01); *G06T 7/251* (2017.01); *G06T 7/75* (2017.01); *G06T 2207/10016* (2013.01); *G06T 2207/30196* (2013.01)

(58) Field of Classification Search
CPC . G06T 2207/10016; G06T 7/251; G06T 7/75; G06T 7/246
See application file for complete search history.

(56) References Cited

U.S. PATENT DOCUMENTS

| | | | |
|---|---|---|---|
| 5,821,945 | A | 10/1998 | Yeo et al. |
| 5,828,809 | A | 10/1998 | Chang et al. |
| 5,969,755 | A | 10/1999 | Courtney |
| 5,974,235 | A | 10/1999 | Nunally et al. |
| 6,181,867 | B1 | 1/2001 | Kenner et al. |
| 6,222,532 | B1 | 4/2001 | Ceccarelli |
| 6,400,890 | B1 | 6/2002 | Nagasaka et al. |
| 6,424,370 | B1 | 7/2002 | Courtney |
| 6,445,409 | B1 | 9/2002 | Ito et al. |
| 6,628,835 | B1 | 9/2003 | Brill et al. |
| 6,643,387 | B1 | 11/2003 | Sethuraman et al. |
| 6,721,454 | B1 | 4/2004 | Qian et al. |
| 6,724,915 | B1 | 4/2004 | Toklu et al. |
| 6,754,389 | B1 | 6/2004 | Dimitrova et al. |
| 6,779,027 | B1 | 8/2004 | Schunicht et al. |
| 6,845,357 | B2 | 1/2005 | Shetty et al. |
| 6,879,709 | B2 | 4/2005 | Tian et al. |
| 6,940,474 | B2 | 9/2005 | Weitbruch et al. |
| 6,940,998 | B2 | 9/2005 | Garoutte |
| 7,020,336 | B2 | 3/2006 | Cohen-Solal et al. |
| 7,068,842 | B2 | 6/2006 | Liang et al. |
| 7,076,102 | B2 | 7/2006 | Lin et al. |
| 7,106,885 | B2 | 9/2006 | Osterweil et al. |
| 7,200,266 | B2 | 4/2007 | Ozer et al. |
| 7,227,569 | B2 | 6/2007 | Maruya |
| 7,330,566 | B2 | 2/2008 | Cutler |
| 7,346,186 | B2 | 3/2008 | Sharoni et al. |
| 8,009,918 | B2 | 8/2011 | Van Droogenbroeck et al. |
| 9,053,516 | B2 | 6/2015 | Stempora |
| 9,204,823 | B2 | 12/2015 | Derenne et al. |
| 9,566,004 | B1 | 2/2017 | Radwin et al. |
| 10,395,373 | B1* | 8/2019 | Brewster .................. G06K 9/00 |
| 2001/0010541 | A1 | 8/2001 | Fernandez et al. |
| 2001/0016007 | A1 | 8/2001 | Wu et al. |
| 2003/0051026 | A1 | 3/2003 | Carter et al. |
| 2003/0053659 | A1 | 3/2003 | Pavlidis et al. |
| 2003/0123703 | A1 | 7/2003 | Pavlidis et al. |
| 2003/0126293 | A1 | 7/2003 | Bushey |
| 2004/0080615 | A1 | 4/2004 | Klein et al. |
| 2004/0081333 | A1 | 4/2004 | Grab et al. |
| 2004/0120548 | A1 | 6/2004 | Qian |
| 2004/0130620 | A1 | 7/2004 | Buehler et al. |
| 2004/0141636 | A1* | 7/2004 | Liang .................. A61B 5/1128 382/110 |
| 2006/0045185 | A1 | 3/2006 | Kiryati et al. |
| 2006/0204045 | A1 | 9/2006 | Antonucci |
| 2006/0215752 | A1 | 9/2006 | Lee et al. |
| 2006/0215753 | A1 | 9/2006 | Lee et al. |
| 2006/0227862 | A1* | 10/2006 | Campbell ................ G06T 7/254 375/240 |
| 2006/0239645 | A1 | 10/2006 | Curtner et al. |
| 2013/0164722 | A1* | 6/2013 | Yoshimitsu ........ G06K 9/00771 434/236 |
| 2018/0285634 | A1* | 10/2018 | Varadarajan .............. G06T 7/73 |
| 2018/0374233 | A1* | 12/2018 | Zhou ........................ G06T 7/248 |
| 2020/0050839 | A1* | 2/2020 | Wolf .................. G06K 9/00342 |

FOREIGN PATENT DOCUMENTS

| | | |
|---|---|---|
| JP | 2000276577 A | 10/2000 |
| JP | 2005295255 A | 10/2005 |
| WO | 0163576 A2 | 8/2001 |
| WO | 2007000637 A2 | 1/2007 |

OTHER PUBLICATIONS

Babapour et al ("Adoption of ergonomic features in a new reach truck cabin design—a usability study", Chalmers University of Technology, SE-412 96 Gothenburg, Sweden, 2012—IOS Press and the authors, pp. 1486-1492) (Year: 2012).*

Akkas, O., Lee, C. H., Hu, Y. H., Yen, T. Y., & Radwin, R. G. (2016). Measuring ele-mental time and duty cycle using automated video processing. Ergonomics, 59(11), 1514-1525.

Greene, R. L, Azari, D. P., Hu, Y. H., & Radwin, R. G. (2017). Visualizing stressful aspects of repetitive motion tasks and opportunities for ergonomic improvements using computer vision. Applied Ergonomics.

Breiman, L., Friedman, J., Stone, C. J., & Olshen, R. A. (1984). Classification and re-gression trees. CRC press (2017).

Bao, S., Howard, N., Spielholz, P., & Silverstein, B. (2006). Quantifying repetitive hand activity for epidemiological research on musculoskeletal disorders—Part II: com-parison of different methods of measuring force level and repetitiveness. Ergonomics, 49(4), 381-392.

Safetyvideopreviews. (2012). Manual Material Handling/Safe Lifting. Retrieved from https://www.youtube.com/watch?=v=rrl2n8qehrY&t=8s.

University of Michigan Center for Ergonomics. (2014). Paper Flopping—Job Modifica-tion. Retrieved from https://www.youtube.com/watch?v=61cu5qvH0kM&index=54&list=PLn5IJRj74S88rnFFV6ObxS6nFdDXUFiGW.

University of Michigan Center for Ergonomics. (2017). Stacking, Facing Line2 CE Re-trieved from https://www.youtube.com/watch?v=MxTgvuhVAJAM=55s.

Lu, M., Waters, T., Krieg, E. and Werren, D.: Efficacy of the revised NIOSH lifting equation for predicting risk of low back pain associated with manual lifting: A one-year prospective study. Human Factors 56(1): 73-85 (2014).

Lipton, "ObjectVideo Forensics: Activity-Based Video Indexing and Retrieval for Physical Security Applications," ObjectVideo, pp. 1-18, date accessed 2009.

Lipton et al., "Critical Asset Protection, Perimeter Monitoring, and Threat Detection Using Automated Video Surveillance," ObjectVideo, pp. 1-11, date accessed 2009.

Mills et al., "A Magnifier Tool for Video Data," Human Interface Group/Advanced Technology, pp. 93-98, 1992.

Porikli et al., "Event Detection by Eigenvector Decomposition Using Object and Frame Features," Mitsubishi Electric Research Laboratories, pp. 1-10, 2004.

Smoliar et al., "Content-Based Video Indexing and Retrieval," IEEE Multimedia, vol. 1(2): 62-72, 1994.

Waters, T.R., Putz-Anderson, V., Garg, A. Applications Manual for the Revised NIOSH Lifting Equation. U.S. Department of Health and Human Services. Publication No. 94-110. (1994). https://www.cdc.gov/niosh/docs/94-110/pdfs/94-110.pdf.

Zivkovic, Zoran, and Ferdinand Van Der Heijden. "Efficient adaptive density estimation per image pixel for the task of background subtraction." Pattern recognition letters 27.7 (2006): 773-780.

Shoushtarian, B. and Bez, H. "A practical adaptive approach for dynamic background subtraction using an invariant colour model and object tracking." Pattern Recognition Letters, Jan. 2005, 26(1):5-26, Jan. 2005.

Medioni et al., "Event Detection and Analysis from Video Streams," IEE Transactions on Pattern Analysis and Machine Intelligence, vol. 23 No. 8, pp. 873-889, Aug. 2001.

Radwin RG, Azari DP, Lindstrom MJ, Ulin SS, Armstrong TJ, Rempel D. A frequency-duty cycle equation for the ACGIH hand activity level. Ergonomics. 2015;58(2):173-183. doi:10.1080/00140139.2014.966154.

(56) References Cited

OTHER PUBLICATIONS

Ali Kemal Sinop and Leo Grady, "A Seeded Image Segmentation Framework Unifying Graph Cuts and Random Walker Which Yields a New Algorithm", Proc. of ICCV, 2007.
C. Rother, V. Kolmogorov, and A. Blake, GrabCut: Interactive foreground extraction using iterated graph cuts, ACM Trans. Graph., vol. 23, pp. 309-314, 2004.
M. Piccardi (Oct. 2004). Background subtraction techniques: a review (PDF). IEEE International Conference on Systems, Man and Cybernetics. 4. pp. 3099-3104.
Barnich, Olivier, and Marc Van Droogenbroeck. "ViBe: A universal background subtraction algorithm for video sequences." IEEE Transactions on Image processing 20.6 (2011): 1709-1724.
Kim, Kyungnam, et al. "Real-time foreground—background segmentation using codebook model." Real-time imaging 11.3 (2005): 172-185.
Zivkovic, Zoran. "Improved adaptive Gaussian mixture model for background subtraction." Pattern Recognition, 2004. ICPR 2004. Proceedings of the 17th International Conference on. vol. 2. IEEE, 2004.
Kim, Sunwook, and Maury A. Nussbaum. "Performance evaluation of a wearable inertial motion capture system for capturing physical exposures during manual material handling tasks." Ergonomics 56.2 (2013): 314-326.
Marras, William S., et al. "Instrumentation for measuring dynamic spinal load moment exposures in the workplace." Journal of Electromyography and Kinesiology 20.1 (2010): 1-9.
Luinge, Henk J., and Peter H. Veltink. "Measuring orientation of human body segments using miniature gyroscopes and accelerometers." Medical and Biological Engineering and computing 43.2 (2005): 273-282.
Borghetti, Michela, et al. "Wearable Sensors for Human Movement Monitoring in Biomedical Applications: Case Studies." Ambient Assisted Living. Springer International Publishing, 2015. 111-123.
Sedai, Suman, Mohammed Bennamoun, and Du Q. Fluynh. "A Gaussian process guided particle filter for tracking 3D human pose in video." IEEE Transactions on Image Processing 22.11 (2013): 4286-4300.
Drory, Ami, Hongdong Li, and Richard Hartley. "A learning-based markerless approach for full-body kinematics estimation in-natura from a single image." Journal of Biomechanics 55 (2017): 1-10.
Shotton, Jamie, et al. "Real-time human pose recognition in parts from single depth images." Communications of the ACM 56.1 (2013): 116-124.
Vemulapalli, Raviteja, Felipe Arrate, and Rama Chellappa. "Human action recognition by representing 3d skeletons as points in a lie group." Proceedings of the IEEE conference on computer vision and pattern recognition. 2014.
Liu, Meiyin, et al. "Silhouette-Based On-Site Human Action Recognition in Single-View Video." Construction Research Congress 2016.
Seo, JoonOh, Kaiqi Yin, and SangHyun Lee. "Automated Postural Ergonomic Assessment Using a Computer Vision-Based Posture Classification." Construction Research Congress 2016. 2016.
Bhattacharya, A., Schulte, P., Anderson, V. Workers' Compensation Costs in Wholesale and Retail Trade Sectors. National Institute for Occupational Safety and Health (2012). https://www.cdc.gov/NIOSH/docs/2013-147/pdfs/2013%E2%80%93147.pdf.
U.S. Bureau of Labor Statistics. 2015 Nonfatal Occupational Injuries and Illnesses: Cases with days away from work. (Nov. 2016) https://www.bls.gov/iif/oshwc/osh/case/osch0058.pdf.
National Institute for Organizational Safety & Health. Number, incidence rate, and median days away from work for nonfatal occupational injuries and illnesses involving days away from work for musculoskeletal disorders4 by part of body and ownership, Wisconsin, 2014. (2015) https://www.bls.gov/iif/oshwc/osh/case/wi2014_pob.pdf.
Hwang, S., Kim, Youngeun and Kim, Youngho. Lower extremity joint kinetics and lumbar curvature during squat and stoop lifting. BMC Musculoskeletal Disorders 2009 10:15 (Feb. 2009).
Plantard, P., Shum, H., Le Pierres, A.S., Multon, F. Validation of an ergonomic assessment method using Kinect data in real workplace conditions. Applied Ergonomics pp. 1-8. (2016).
Spector, J.T., Lieblich, M., Bao, S., McQuade, K., and Hughes, M. Automation of Workplace Lifting Hazard Assessment for Musculoskeletal Injury Prevention. Annals of Occupational and Environmental Medicine, 26:15. (2014).
Chaffin, D.B. Development of Computerized Human Static Strength Simulation Model for Job Design. Human Factors and Ergonomics in Manufacturing, 7 (4) pp. 305-322. (1997).
University of Michigan Center for Ergonomics. 3DSSPP: Background Information. (2017). https://c4e.engin.umich.edu/tools-services/3dsspp-software/3dsspp-background-information/.
Burgess-Limerick, R., Abernathy, B. Toward a Quantitative Definition of Manual Lifting Postures, Human Factors, 39 (1), pp. 141-148. (1997). http://journals.sagepub.com/doi/pdf/10.1518/001872097778940632.
Anderson C.K., Chaffin, D.B., Herrin, G.D., and Matthew, L.S. A Biomechanical Model of the Lumbosacral Joint during Lifting Activities. Journal of Biomechanics, 18 (8), pp. 571-584. (1985).
Dysart, M.J., Woldstad, J.C. Posture Prediction for Static Sagittal-Plane Lifting. Journal of Biomechanics, 29 (10), pp. 1393-1397. (Oct. 1996). http://www.sciencedirect.com/science/article/pii/0021929096000280.
ACGIH (American Conference of Governmental Industrial Hygienists). TLV® / BEI® Introduction. http://www.acgih.org/tlv-bei-guidelines/tiv-bei-introduction (2017).
Straker, L. Evidence to support using squat, semi-squat and stoop techniques to lift low-lying objects. International Journal of Industrial Ergonomics, 31, pp. 149-160. (2003).
Gordon, C.C, et al. 2012 Anthropometric Survey of U.S. Army Personnel: Methods and Summary Statistics. (2014).
Mathworks. Decision Trees. https://www.mathworks.com/help/stats/classification-trees-and-regression-trees.html (2017).
Waters, T.R., Putz-Anderson, V., Garg, A, Fine, L.J. Revised NIOSH Equation for the design and evaluation of manual lifting tasks. Ergonomics, 1993, vol. 36, No. 7, 749-776.
Drinkaus, Phillip, Sesek, Richard, Bloswick, Donald S., "Job Level Risk Assessment Using Task Level ACGIH Hand Activity Level TLV Scores: A Pilot Study", International Journal of Occupational Safety and Ergonomice (JOSE) 2005, vol. 11, No. 3, 263-281.
Chen, Chia-Hsiung, et al. "Automated video exposure assessment of repetitive hand activity level for a load transfer task." Human Factors: The Journal of the Human Factors and Ergonomics Society (2013), 55(2): 298-308.
Mark Wilson, "Testing Project Natal: We Touched the Intangible", Jun. 3, 2009. http://gizmodo.com/5277954/testing-project-natal-we-touched-the-intangible/.
Mike Schramm, "Kinect: The company behind the tech explains how it works", Jun. 19, 2010. http://www.joystiq.com/2010/06/19/kinect-how-it-works-from-the-company-behind-the-tech/.
Alex Pham, "E3: Microsoft shows off gesture control technology for Xbox 360", Jun. 1, 2009. http://latimesblogs.latimes.com/technology/2009/06/microsofte3.html.
Stephen Totilo, "Natal Recognizes 31 Body Parts, Uses Tenth of Xbox 360 Computing Resources", Jan. 1, 2010. http://kotaku.com/5442775/natal-recognizes-31-body-parts-uses-tenth-of-xbox-360-computing-resources.
Burgess-Limerick, R. Squat, stoop, or something in between?. International Journal of Industrial Ergonomics, 31, pp. 143-148. (2003).

\* cited by examiner

US 10,810,414 B2

MOVEMENT MONITORING SYSTEM

CROSS REFERENCE TO RELATED APPLICATIONS

This application is a continuation-in-part application of co-pending application Ser. No. 15/727,283 filed on Oct. 6, 2017, which claims the benefit of U.S. Provisional Patent Application Ser. No. 62/529,440 filed on Jul. 6, 2017. The disclosures of these priority applications are incorporated by reference herein in their entireties.

STATEMENT REGARDING FEDERALLY SPONSORED RESEARCH OR DEVELOPMENT

This invention was made with government support under OH011024 awarded by the Center for Disease Control and Prevention. The government has certain rights in the invention.

TECHNICAL FIELD

The present disclosure pertains to monitoring systems and assessment tools, and the like. More particularly, the present disclosure pertains to video analysis monitoring systems and systems for assessing risks associated with movement and exertions.

BACKGROUND

A variety of approaches and systems have been developed to monitor physical stress on a subject. Such monitoring approaches and systems may require manual observations and recordings, cumbersome wearable instruments, complex linkage algorithms, and/or complex three-dimensional (3D) tracking. More specifically, the developed monitoring approaches and systems may require detailed manual measurements, manual observations over a long period of time, observer training, sensors on a subject, and/or complex recording devices. Of the known approaches and systems for monitoring physical stress on a subject, each has certain advantages and disadvantages.

SUMMARY

This disclosure is directed to several alternative designs for, devices of, and methods of using monitoring systems and assessment tools. Although it is noted that monitoring approaches and systems are known, there exists a need for improvement on those approaches and systems.

Accordingly, one illustrative instance of the disclosure may include a marker-less subject tracking system. The tracking system may include an input port and a controller in communication with the input port. The input port may receive digital video of a subject. The controller may be configured to identify a height of the subject within a frame of the digital video and a width of the subject in the frame of the digital video. The controller may be configured to determine a posture of the subject in the frame based on the height of the subject in the frame and the width of the subject in the frame.

Alternatively or additionally to any of the embodiments above, the controller may be configured to automatically determine postures of the subject in real time during playback of the digital video.

Alternatively or additionally to any of the embodiments above, the controller may be configured to determine the posture of the subject in the digital video based on a normalized height of the subject in the frame and a normalized width of the subject in the frame, where the height of the subject in the frame and the width of the subject in the frame may be normalized based on a standing height of the subject to determine the normalized height of the subject in the frame and the normalized width of the subject in the frame.

Alternatively or additionally to any of the embodiments above, the controller may be configured to use a decision tree model to determine the posture of the subject in the digital video based on the height of the subject and the width of the subject determined from the digital video.

Alternatively or additionally to any of the embodiments above, the determined posture may be selected from a group consisting of a standing posture, a stooping posture, and a squatting posture.

Alternatively or additionally to any of the embodiments above, to determine the posture of the subject in the frame, the controller may be configured to compare a value based on the height of the subject in the frame to one or both of a first height threshold value and a second height threshold value, and compare a value based on the width of the subject in the frame to one or both of a first width threshold value and a second width threshold value.

Alternatively or additionally to any of the embodiments above, the controller may be configured to determine the height of the subject and the width of the subject in the digital video using pixel information in the digital video.

Alternatively or additionally to any of the embodiments above, the controller is configured to apply a bounding box around the subject in the digital video, assign a height of the bounding box as the height of the subject, and assign a width of the bounding box as the width of the subject.

Alternatively or additionally to any of the embodiments above, the controller may be configured to determine extreme-most pixels in two dimensions of the subject, and the bounding box intersects the determined extreme-most pixels in the two dimensions of the subject.

Alternatively or additionally to any of the embodiments above, the controller may be configured to determine extreme-most pixels in a first dimension of the subject and assign a distance between the extreme-most pixels in the first dimension as the height of the subject, and determine extreme-most pixels in a second dimension of the subject and assign a distance between the extreme-most pixels in the second dimension as the width of the subject.

Another illustrative instance of the disclosure may include a computer readable medium having a program code stored thereon in a non-transitory state for use by a computing device. The program code may cause the computing device to execute a method for determining a posture of a subject in video. The method may further include identifying a subject within a frame of video, determining a height of the subject within the frame of the video, determining a width of the subject within the frame of the video, comparing one or both of a value based on the height of the subject and a value based on a width of the subject to one or more threshold values. In some cases, the method may include determining a posture of the subject within the frame of the video based on the comparing of one or both of a value based on the height of the subject and a value based on a width of the subject to one or more threshold values.

Alternatively or additionally to any of the embodiments above, the method may further include determining the value based on the height of the subject in the frame and the value based on the width of the subject in the frame by normalizing the height of the subject in the frame and the width of the subject in the frame by a standing height of the subject.

Alternatively or additionally to any of the embodiments above, the determined posture may be selected from a group consisting of a standing posture, a stooping posture, and a squatting posture.

Alternatively or additionally to any of the embodiments above, determining the posture of the subject within the frame of the video may further comprise comparing the value based on the height of the subject to a first height threshold value, and when the value based on the height of the subject has reached or gone beyond the first height threshold value, determining the subject is in a standing posture.

Alternatively or additionally to any of the embodiments above, determining the posture of the subject within the frame of the video may further comprise comparing the value based on the height of the subject to a second height threshold value, and when the value based on the height of the subject has not reached or gone beyond the first height threshold value and when the value based on the height of the subject has not reached or gone beyond the second height threshold value, determining the subject is in a squatting posture.

Alternatively or additionally to any of the embodiments above, determining the posture of the subject within the frame of the video may further comprise comparing the value based on the width of the subject to a first width threshold value, and when the value based on the height of the subject has not reached or gone beyond the first height threshold value and has reached or gone beyond the second height threshold value and when the value based on the width of the subject has reached or gone beyond the first width threshold value, determining the subject is in a stooping posture.

Alternatively or additionally to any of the embodiments above, determining the posture of the subject within the frame of the video may further comprise comparing the value based on the width of the subject to a second width threshold value, wherein when the value based on the height of the subject has not reached or gone beyond the first height threshold value and has reached or gone beyond the second height threshold value and the value based on the width of the subject has not reached or gone beyond the first width threshold and: when the value based on the width of the subject has reached or gone beyond the second width threshold value, determining the subject is in a standing posture, and when the value based on the width of the subject has not reached or gone beyond the second width threshold value, determining the subject is in a squatting posture.

Alternatively or additionally to any of the embodiments above, the method may further comprise applying a bounding box around the subject within the frame of the video, determining the height of the subject within the frame of the video based on a height of the applied bounding box, and determining the width of the subject with the frame of the video based on a width of the applied bounding box.

Another illustrative instance of the disclosure may include a tracking system. The tracking system may include a processor and memory in communication with the processor. The memory may include instructions executable by the processor to analyze pixel information in a video, compare a value based on a height of a subject in the video to one or more height threshold values, compare a value based on a width of a subject in the video to one or more width threshold values, and determine a posture of the subject in the video using the comparison of the value based on the height of the subject in the video to one or more height threshold values and the comparison of the value based on the width of the subject in the video to one or more width threshold values.

Alternatively or additionally to any of the embodiments above, to analyze pixel information in the video, the processor and memory may be further configured to determine extreme-most pixels in a first dimensions of the subject and assign a distance between the extreme-most pixels in the first dimension as the height of the subject, and determine extreme-most pixels in a second dimension of the subject and assign a distance between the extreme-most pixels in the second dimension as the width of the subject.

The above summary of some example embodiments is not intended to describe each disclosed embodiment or every implementation of the disclosure.

BRIEF DESCRIPTION OF THE DRAWINGS

The disclosure may be more completely understood in consideration of the following detailed description of various embodiments in connection with the accompanying drawings, in which.

Figure 1:
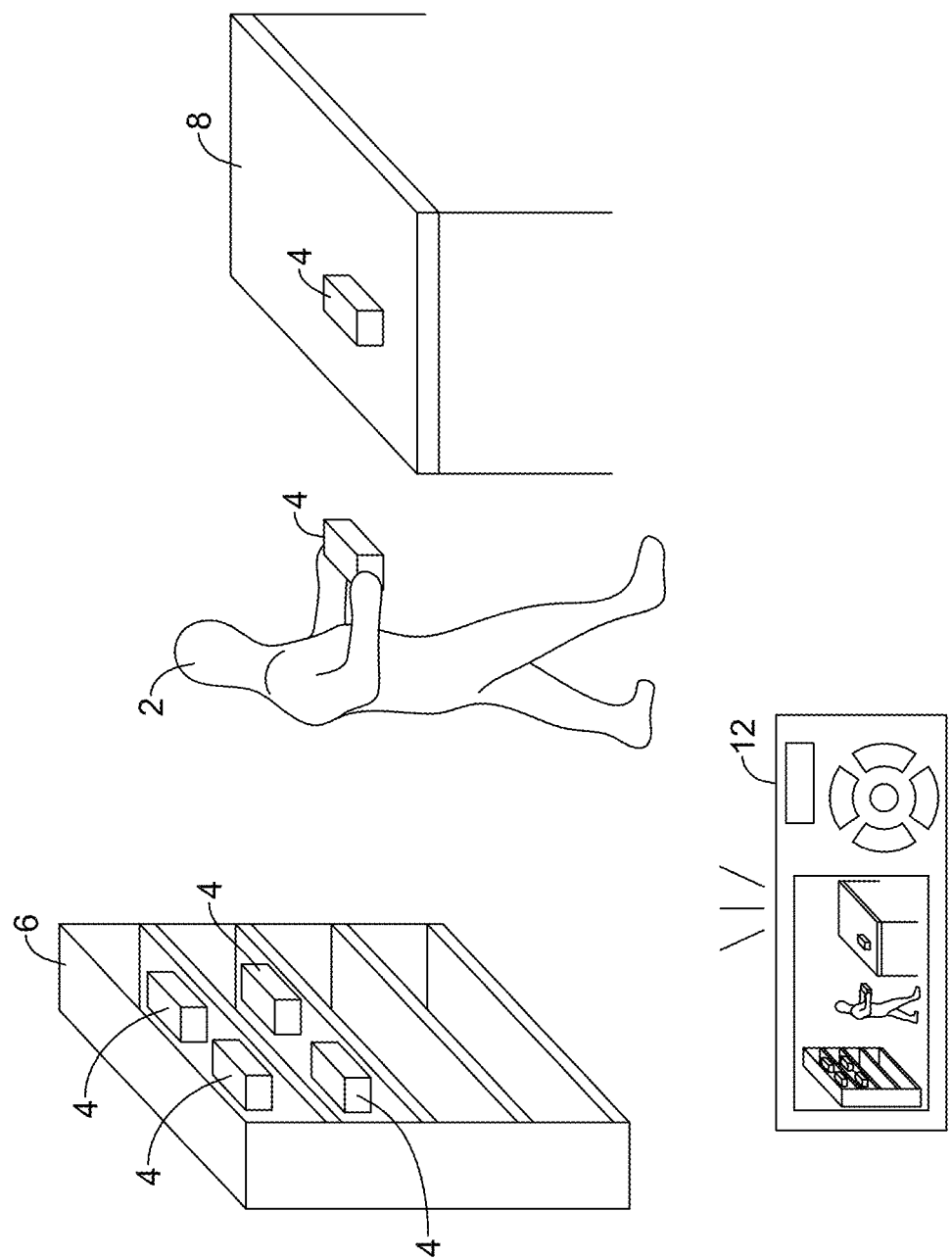
FIG. 1 is a schematic view of an illustrative monitoring system capturing images of a task being performed.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

Physical exertion is a part of many jobs. For example, manufacturing and industrial jobs may require workers to perform manual lifting tasks (e.g., an event of interest or predetermined task). In some cases, these manual lifting tasks may be repeated throughout the day. Assessing the worker's movements and/or exertions while performing tasks required by manufacturing and/or industrial jobs and/or movements of workers in other jobs or activities may facilitate reducing injuries by identifying movement that may put a worker at risk for injury.

Repetitive work (e.g., manual work or other work) may be associated with muscle fatigue, back strain, injury, and/or other pain as a result of stress and/or strain on a person's body. As such, repetitive work (e.g., lifting, etc.) has been studied extensively. For example, studies have analyzed what is a proper posture that reduces physical injury risk to a minimum while performing certain tasks and have also analyzed movement cycles (e.g., work cycles) and associated parameters (e.g., a load, a horizontal location of the origin and destination of the motion (e.g., a lift motion or other motion), a vertical location of the origin and destination of the motion, a distance of the movement, a frequency of the motion, a duration of the movement, a twisting angle during the motion, a coupling with an object, etc.). Additional parameters associated with movement cycles may include the speed and acceleration of movement of the subject and/or an object moved at an origin and/or destination of movement. Some of these parameters may be used to identify a person's risk for an injury during a task based on guidelines such as the National Institute for Occupational Safety and Health (NIOSH) lifting equation or the American Conference of Governmental Industrial Hygienists (ACGIH) Threshold Limit Value (TLV) for manual lifting, among others.

In order to control effects of repetitive work on the body, quantification of parameters such as posture assumed by the body while performing a task, the origin and/or destination of objects lifted during a task, duration of the task, position assumed during the task, and frequency of the task, among other parameters, may facilitate evaluating an injury risk for a worker performing the task. A limitation, however, of identifying postures, the origin and destination of movement or moved objects, and/or analyzing movement cycles is that it can be difficult to extract parameter measurements from an observed scene during a task.

In some cases, wearable equipment may be used to obtain and/or record values of parameters in an observed scene during a task, but such wearable equipment may require considerable set-up, may be cumbersome, and may impede the wearer's movements and/or load the wearer's body, and as a result, may affect performance of the wearer such that the observed movements are not natural movements made by the wearer when performing the observed task. Furthermore, it is difficult to identify an actual context of signals obtained from wearable instruments alone. Thus, it may be desirable to observe a scene during a task without the use of wearable equipment.

Observing a scene without directly affecting movement of a person performing a task may be accomplished by recording the person's movements using video. In some cases, complex 3D video equipment and measurement sensors may be used to capture video of a person performing a task. However, complex 3D video systems and/or measurement sensors may be cumbersome and may interfere with work activity.

Recorded video (e.g., image data of the recorded video) may be processed in one or more manners to identify and/or extract parameters from the recorded scene. Some approaches for processing the image data may include recognizing a body of the observed person and each limb associated with the body in the image data. Once the body and limbs are recognized, motion parameters of the observed person may be analyzed. Identifying and tracking the body and the limbs of an observed person, however, may be difficult and may require complex algorithms and classification schemes. Such difficulties in identifying the body and limbs extending therefrom stem from the various shapes bodies and limbs may take and a limited number of distinguishable features for representing the body and limbs as the observed person changes configurations (e.g., postures) while performing a task.

This disclosure discloses an approach for analyzing video (e.g., recorded with virtually any digital camera) that does not require complex classification systems, which results in an approach that uses less computing power and takes less time for analyses than the more complex and/or cumbersome approaches discussed above. In some cases, the disclosed approach may be, or may be embodied in, a markerless tracking system. The disclosed approach may identify a contour, or a portion of a contour, of a subject (e.g., a body of interest, a person, an animal, a machine and/or other subject) and determine parameter measurements from the subject in one or more frames of the video (e.g., a width dimension and/or a height dimension of the subject, a location of hands and/or feet of a subject, a distance between hands and feet of the subject, when the subject is beginning and/or ending a task, and/or other parameter values). In some cases, a bounding box (described in greater detail below) may be placed around the subject and the dimension of the bounding box may be used for determining one or more parameter values and/or position assessment values relative to the subject. For example, the dimensions of the bounding box and/or other parameters of the bounding box or the subject may be utilized for analyzing positions and/or movements of the subject and providing position assessment information of the subject using lifting guidelines, including, but not limited to, the NIOSH Lifting Equation and the ACGIH TLV for manual lifting. Although the NIOSH and ACGIH equations are discussed herein, other equations and/or analyses may be performed when doing a risk assessment of movement in a video.

The NIOSH Lifting Equation is a tool used by safety professionals to assess manual material handling jobs and provides an empirical method for computing a weight limit for manual lifting. The NIOSH Lifting Equation takes into account measurable parameters including a vertical and horizontal location of a lifted object relative to a body of a subject, duration and frequency of the task, a distance the object is moved vertically during the task, a coupling or quality of the subject's grip on the object lifted/carried in the task, and an asymmetry angle or twisting required during the task. A primary product of the NIOSH Lifting Equation is a Recommended Weight Limit (RWL) for the task. The RWL prescribes a maximum acceptable weight (e.g., a load) that nearly all healthy employees could lift over the course of an eight (8) hour shift without increasing a risk of musculoskeletal disorders (MSD) to the lower back. A Lifting Index (LI) may be developed from the RWL to provide an estimate of a level of physical stress on the subject and MSD risk associated with the task.

The NIOSH Lifting Equation for a single lift is:

$$LC \times HM \times VM \times DM \times AM \times FM \times CM = RWL \quad (1)$$

LC, in equation (1), is a load constant of typically 51 pounds, HM is a horizontal multiplier that represents a horizontal distance between a held load and a subject's spine, VM is a vertical multiplier that represents a vertical height of a lift, DM is a distance multiplier that represents a total distance a load is moved, AM is an asymmetric multiplier that represents an angle between a subject's sagittal plane and a plane of asymmetry (the asymmetry plane may be the vertical plane that intersects the midpoint between the ankles and the midpoint between the knuckles at an asymmetric location), FM is a frequency multiplier that represents a frequency rate of a task, and CM is a coupling multiplier that represents a type of coupling or grip a subject may have on a load. The Lifting Index (LI) is defined as:

$$(Weight)/(RWL) = LI \quad (2)$$

The "weight" in equation (2) may be the average weight of objects lifted during the task or a maximum weight of the objects lifted during the task. The NIOSH Lifting Equation is described in greater detail in Waters, Thomas R. et al., "Revised NIOSH equation for the design and evaluation of manual lifting tasks", ERGONOMICS, volume 36, No. 7, pages 749-776 (1993), which is hereby incorporated by reference in its entirety.

The ACGIH TLVs are a tool used by safety professionals to represent recommended workplace lifting conditions under which it is believed nearly all workers may be repeatedly exposed day after day without developing work-related low back and/or shoulder disorders associated with repetitive lifting tasks. The ACGIH TLVs take into account a vertical and horizontal location of a lifted object relative to a body of a subject, along with a duration and frequency of the task. The ACGIH TLVs provide three tables with weight limits for two-handed mono-lifting tasks within thirty (30) degrees of the sagittal (i.e., neutral forward) plane. "Mono-lifting" tasks are tasks in which loads are similar and repeated throughout a work day.

In some cases, certain parameters related to a subject performing a task (e.g., lifting and/or moving objects or any other task) may be weighted less than other parameters when doing an injury risk assessment. For example, in some cases, a subject's grip on an object and/or an angle of twisting while holding the object may be weighted less in an injury risk assessment than a frequency of the task, the speed of the task, the acceleration of the task, the distance from the hands to the feet of the subject when performing the task, the posture of the subject while performing the task, and/or other parameters. However, the weight applied to a parameter may differ for different tasks and/or analyses. In some cases, parameters weighted less than others may be neglected and not used during analyses of movement of the subject in the video, as long as it is noted that the parameters were not used in the analyses.

The disclosed approach for analyzing recorded video of a task (e.g., a two-dimensional (2D) or 3D video depicting lifts in a sagittal plane and/or one or more similar or different tasks) may include extracting simple features from the video, rather than using complex linkage models generally used in motion tracking. This approach may incorporate segmenting a subject (e.g., a foreground) from a background via subtraction and then extracting motion parameters from subject (e.g., a bounded foreground or other foreground), which does not require complex limb tracking. Dimensions, such as a height dimension (e.g., a maximum height dimension), a width dimension (e.g., a maximum width dimension) and/or other dimensions, of the subject in a segmented frame of the video may be obtained to provide position information (e.g., posture or other position information) for the subject in frames of the video. Position information for the subject in frames of the video may include, but is not limited to, determining joint angles of the subject and/or determining whether the subject is in a stooping position, bending position, squatting position, standing position, twisting position, etc.

In some cases, a shape (e.g., a two-dimensional shape, such as a bounding box) may be manually drawn or drawn in an automated manner (e.g., computationally with a computing device) tightly around the subject and the dimensions of the shape (e.g., a maximum height and a maximum width) may be indicative of the position and/or other parameters of the subject as the subject moves. In one example, dimensions of a shape extending around the subject may indicate a posture of the subject. Further, in segmented frames of the video ghost effects of objects moved during a task (e.g., effects seen when a moving object becomes static and separated from the subject and/or when a static object starts to move) may be identified to determine a beginning and/or ending of a task performed by the subject, determine hand locations, hand locations relative to feet, to infer loading/unloading locations of the subject, determine an orientation of the subject, and/or determine one or more other parameters relative to the subject. Based on extracted quantities from the dimensions of the subject in segmented frames of the video (e.g., horizontal and vertical distance between the hands and feet, etc.), frequency of a task, speed of the subject during the task, acceleration of the subject or object moved during the task, and/or other parameters may be determined and/or analyzed (e.g., in the NIOSH Lifting Equation, in the ACGIH TLV for Manual Lifting, and/or in one or more other equations or analyses).

Figure 2:
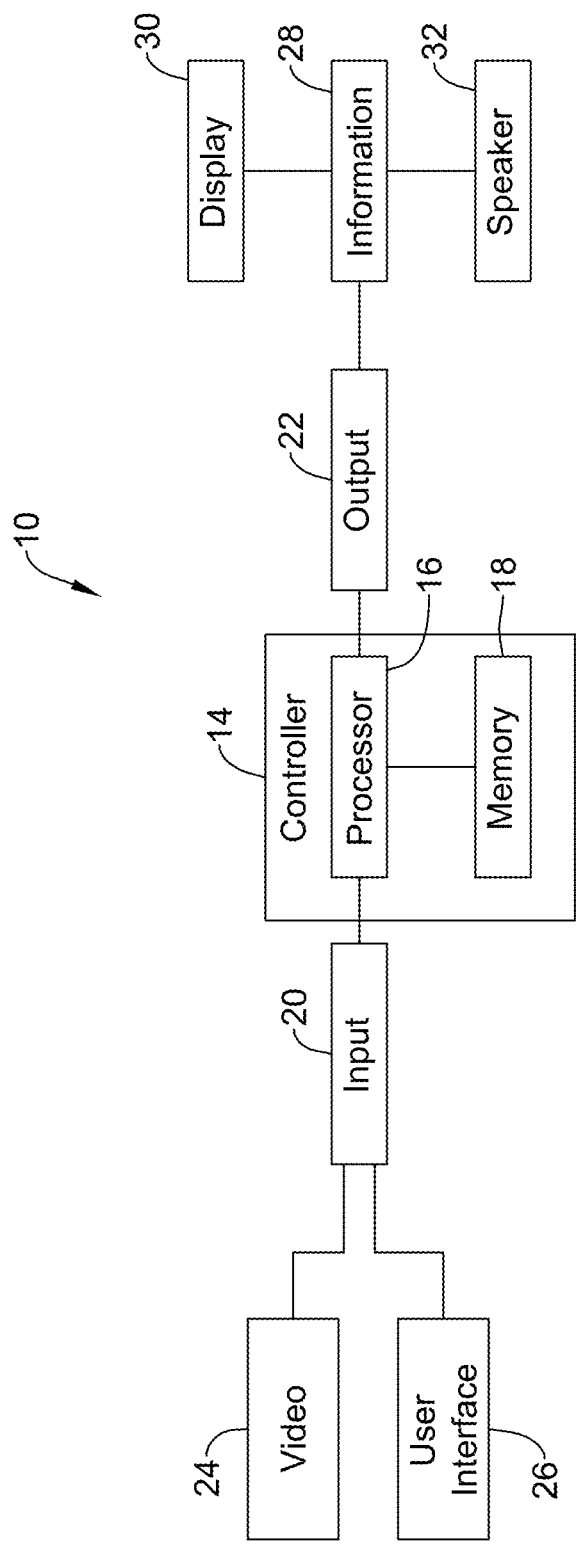
FIG. 2 is a schematic box diagram of an illustrative monitoring system.
Figure 3:
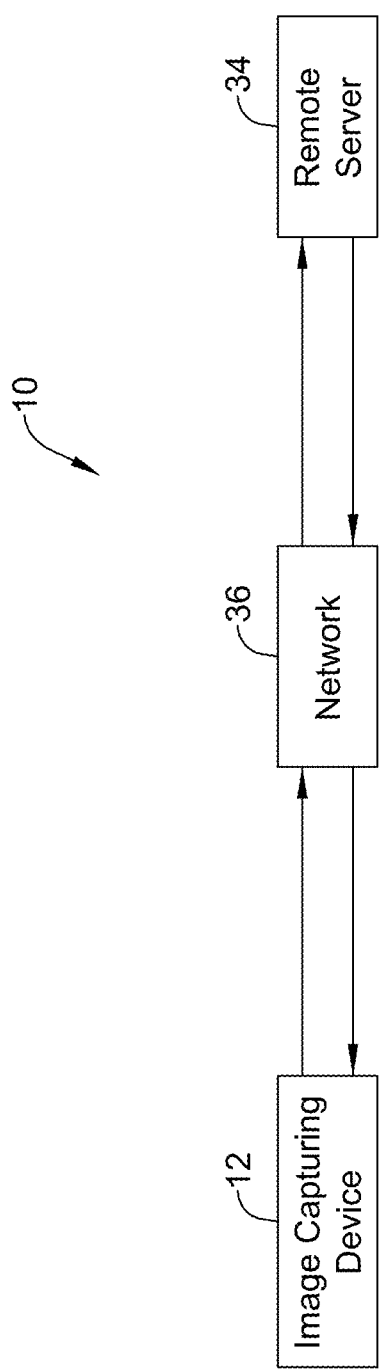
FIG. 3 is a schematic box diagram depicting an illustrative flow of data in a monitoring system.

Turning to the Figures, FIG. 1 is a schematic view of an image capturing device 12 of a tracking and/or monitoring system (e.g., a tracking or monitoring system 10, as shown in FIGS. 2 and 3) set up to observe a subject 2 perform a task (e.g., moving objects 4 from a shelf 6 to a table 8, as shown in FIG. 1, or other task). The image capturing device 12 may be or may include one or more of a phone (e.g., a camera-equipped smart phone or other phone), a portable digital camera, a dedicated digital camera (e.g., a security camera or other dedicated camera), a digital camcorder, a tablet computer, a laptop, a desktop, and/or a suitable other electronic device capable of recording video.

Video of the subject 2 performing a task may be captured with the image capturing device(s) 12 set up at a suitable angle relative to a sagittal plane and/or other portion of the subject 2 in the video. For example, the image capturing device 12 may be at an angle of 90 degrees (perpendicular) to the sagittal plane of the subject 2, 60 degrees to the sagittal plane of the subject 2, 120 degrees to the sagittal plane of the subject 2, within the range of 60 to 120 degrees to the sagittal plane of the subject 2, and/or within one or more other suitable ranges of angles relative to the sagittal plane of the subject 2 The angles of the image capturing device 12 relative to the subject 2 may be measured from a center of a field of view of the image capturing device 12 and/or other suitable reference point. Positioning of the image capturing device(s) 12 relative to the subject 2 may be configured to facilitate observing one or more parameters of the subject 2 including, but not limited to, a posture of the subject 2, movement of the subject 2, and/or other suitable parameters of the subject 2.

In some cases, video of the subject 2 performing a task may be captured with two or more image capturing devices 12. When two or more image capturing devices 12 are used, it may be possible to capture video of the subject 2 performing a task at the above-noted angles relative to the sagittal plane of the subject 2 and/or at additional or alternative angles relative to the sagittal plane of the subject 2. Additionally or alternatively, although 2D data is primarily discussed herein as being captured by the image capturing device(s) 12, the image capturing device(s) 12 may be utilized to capture 3D image data of the subject 2 and such 3D image data may be utilized to analyze a task performed by the subject 2 in a manner similar to those described herein for captured 2D data.

Although the shelf 6 and the table 8 used in the performed task that is depicted in FIG. 1 are spaced from one another such that the subject 2 may be required to traverse a distance between the shelf 6 and the table 8, the shelf 6 and the table 8 may be a suitable distance apart for a task that is less than or greater than what is depicted in FIG. 1. Additionally or alternatively, elements other than the shelf 6 and the table 8 may be utilized when performing a task monitored with the monitoring system 10 or other monitoring system.

The monitoring system 10 may take on one or more of a variety of forms and the monitoring system 10 may include or may be located on one or more electronic devices. In some cases, the image capturing device 12 of the monitoring system 10 may process the recorded video thereon. Alternatively, or in addition, the image capturing device 12 may send, via a wired connection or wireless connection, at least part of the recorded video or at least partially processed video to a computing device (e.g., a laptop, desktop computer, server, a smart phone, a tablet computer, and/or other computer device) included in or separate from the monitoring system 10 for processing.

FIG. 2 depicts a schematic box diagram of the monitoring system 10. The monitoring system 10, as depicted in FIG. 2, may include a controller 14 having a processor 16 (e.g., a microprocessor, microcontroller, or other processor) and memory 18. Further, the monitoring system 10 may include an input port 20 and an output port 22 configured to communicate with one or more components in communication with the controller 14 and/or with one or more remote devices over a network (e.g., a single network or two or more networks). The input port 20 may be configured to receive inputs such as video 24 (e.g., digital video and/or other video from the image capturing device 12, as shown in FIG. 1), instructions from a user interface 26 (e.g., a display, keypad, touch screen, mouse, stylus, microphone, and/or other user interface device), communication signals, and/or other inputs. The output port 22 may be configured to output information 28 (e.g., alerts, alarms, analysis of processed video, and/or other information), a control signal, and/or communication signals to a display 30 (a light, LCD, LED, touch screen, and/or other display), a speaker 32, and/or other suitable devices. In some cases, the display 30 and/or the speaker 32 may be components of the user interface 26, but this is not required, and the display 30 and/or the speaker 32 may be, or may be part of, a device or component separate from the user interface 26. In some cases, the controller 14 may include a timer (not shown). The timer may be integral to the processor 16 or may be provided as a separate component.

The input port 20 and/or the output port 22 may be configured to receive and/or send information and/or communication signals using one or more protocols. For example, the input port 20 and/or the output port 22 may communicate with other devices or components using a wired connection, ZigBee, Bluetooth, WiFi, IrDA, dedicated short range communication (DSRC), Near-Field Communications (NFC), EnOcean, and/or any other suitable common or proprietary wired or wireless protocol, as desired.

In some cases, the image capturing device 12 may provide the video 24, the user interface 26, the display 30, and/or the speaker 32 and may be part of the monitoring system 10 or separate from the monitoring systems 10. When one or more of the image capturing device 12, the user interface 26, the display 30, and/or the speaker 32 are part of the monitoring system 10, the features of the monitoring system 10 may be in a single device (e.g., two or more of the capturing device 12, controller 14, the user interface 26, the display 30, and/or the speaker 32 may all be in a single device) or may be in multiple devices (e.g., the image capturing device 12 may be a separate device that the display 30, but this is not required). In some cases, the monitoring system 10 may exist substantially entirely in a computer readable medium (e.g., memory 18, other memory, or other computer readable medium) having instructions (e.g., a control algorithm or other instructions) stored in a non-transitory state thereon that are executable by a processor (e.g., the processor 16 or other processor).

The memory 18 of the controller 14 may be in communication with the processor 16. The memory 18 may be used to store any desired information, such as the aforementioned monitoring system 10 (e.g., a control algorithm), recorded video, parameters values (e.g., frequency, speed, acceleration, etc.) extracted from video, thresholds, equations for use in analyses (e.g., NIOSH Lifting Equation, ACGIH TLV for Manual Lifting, etc.), and the like. The memory 18 may be any suitable type of storage device including, but not limited to, RAM, ROM, EPROM, flash memory, a hard drive, and/or the like. In some cases, the processor 16 may store information within the memory 18, and may subsequently retrieve the stored information from the memory 18.

FIG. 3 depicts a schematic box diagram of a monitoring system 10 having an image capturing device 12 connected to a remote server 34 (e.g., a web server or other server) through a network 36. When so configured, the image capturing device 12 may send recorded video to the remote server 34 over the network 36 for processing. Alternatively, or in addition, the image capturing device 12 and/or an intermediary device (not necessarily shown) between the image capturing device 12 and the remote server 34 may process a portion of the video and send the partially processed video to the remote server 34 for further processing and/or analyses. The remote server 34 may process the video and send the processed video and/or results of the processing of the video (e.g., a risk assessment, RWL, LI, etc.) back to the image capturing device, send the results to other electronic devices, save the results, and/or perform one or more other actions.

The remote server 34 may be any computing device configured to process and/or analyze video and communicate with a remote device (e.g., the image capturing device 12 or other remote device). In some cases, the remote server 34 may have more processing power than the image capturing device 12 and thus, may be more suitable for analyzing the video recorded by the image capturing device, but this is not always the case.

The network 36 may include a single network or multiple networks to facilitate communication among devices connected to the network 36. For example, the network 36 may include a wired network, a wireless local area network (LAN), a wide area network (WAN) (e.g., the Internet), and/or one or more other networks. In some cases, to communicate on the wireless LAN, the output port 22 may include a wireless access point and/or a network host device and in other cases, the output port 22 may communicate with a wireless access point and/or a network access point that is separate from the output port 22 and/or the image capturing device 12. Further, the wireless LAN may include a local domain name server (DNS), but this is not required for all embodiments. In some cases, the wireless LAN may be an ad hoc wireless network, but this is not required.

Figure 4:
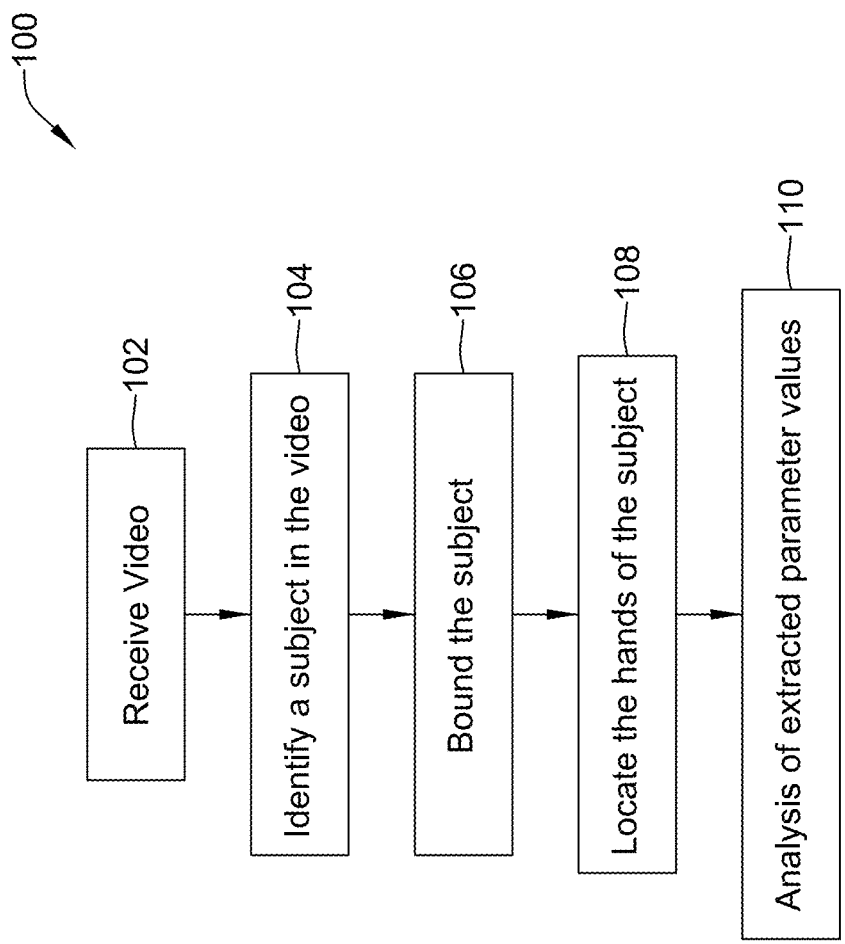
FIG. 4 is a schematic flow diagram of an illustrative method of monitoring movement of a subject.

FIG. 4 depicts a schematic overview of an approach 100 for identifying and analyzing movement of a subject (e.g., the subject 2 or other suitable subject) in video without the use of sensors or continuous tracking of limbs of a subject via linkage algorithms. The approach 100 may include receiving 102 video from an image capturing source (e.g., the image capturing device 12 or other source) and identifying 104 the subject in the video. Once the subject is identified 104, the subject may be bound 106 and the hands of the subject may be located 108. After locating 108 the hands of the subject, parameters values extracted from the video by identifying the subject, a bound of the subject, a location of the hands, and/or other parameters may be analyzed 110 to determine a position of the subject (e.g., a lifting state or other state of the subject). In some cases, the analyses may include using the obtained parameter values in the NIOSH Lifting Equation, the ACGIH TLVs for Manual Lifting, and/or other movement analyses equations to evaluate risk of injury to the subject while performing a task recorded in the video, but the obtained parameter values may be analyzed for one or more other purposes.

Identifying 104 the subject in received video may be accomplished in one or more manners. For example, the subject may be identified 104 in received video by manually identifying the subject and/or by identifying the subject in an automated or at least partially automated manner (e.g., automatically and/or in response to a manual initiation). A subject may be manually identified by manually outlining the subject, by applying a shape (e.g., a box or other shape) around the subject, by clicking on the subject, and/or manually identifying the subject in one or more other manners. Background subtraction or other suitable techniques may be utilized to automatically identify or identify in an automated manner a contour of the subject (e.g., a foreground). Other suitable manual techniques and/or automated techniques may be utilized to identify a subject in received video.

Background subtraction may be performed in one or more manners. In general, background subtraction may be performed by statistically estimating whether a pixel in the current frame of video (e.g., each pixel or a set of pixels in the current frame) belongs to the background or the foreground depicted in the frame. To facilitate statistically estimating whether a pixel belongs to the background or the foreground depicted in a frame, each pixel or set of pixels may be given a value based on a feature (e.g., color, shading, intensity, etc.) of the pixel. Here, an underlying assumption is that values of a background pixel in a video will change slowly over time (e.g., background pixels may be expected to remain unchanged for at least a plurality of consecutive frames of video) compared to values of a foreground pixel (e.g., foreground pixels, especially those on or around a periphery of a subject, may be expected to change from frame-to-frame in video and/or at least more rapidly than background pixels). As a result, values of a pixel over a fixed window of a past set of frames can be used to estimate the pixel value at the current frame (e.g., in some cases, the estimated pixel value may be considered an expected pixel value). If the prediction is sufficiently accurate with respect to an actual pixel value at the current frame, this pixel is likely to be and/or may be considered to be a background pixel. Otherwise, this pixel is likely to be and/or may be considered to be a foreground pixel. Alternatively or in addition, an estimated pixel value may be indicative of a foreground pixel and if the prediction is sufficiently accurate with respect to an actual pixel value at the current frame, the pixel is likely to be and/or may be considered to be a foreground pixel. Otherwise, the pixel is likely to be and/or may be considered to be a background pixel.

As used herein, a pixel may be a smallest addressable element in an image or display device. Each pixel used to depict a frame of video may have an address or physical coordinates in a two-dimensional grid in the frame.

One may model the values of a pixel over a fixed number of past video frames using a Mixture of Gaussian (MOG) model and update the model parameters adaptively as the algorithm progresses over time to provide estimates of pixel values and determine if a pixel belongs to the background or the foreground. An example MOG approach is described in Zivkovic, Zoran. "Improved adaptive Gaussian mixture model for background subtraction." Pattern Recognition, 2004, ICPR 2004, Proceedings of the 17th International Conference on. Vol. 2. IEEE, 2004, which is hereby incorporated by reference in its entirety. Another example MOG approach is described in Zivkovic, Zoran, and Ferdinand Van Der Heijden. "Efficient adaptive density estimation per image pixel for the task of background subtraction." Pattern recognition letters 27.7 (2006): 773-780, which is hereby incorporated by reference in its entirety. Additionally, or alternatively, other modeling techniques and/or segmentation approaches may be utilized to differentiate between a background and a foreground.

The background subtraction may be done on color video, gray-scale video, black and white video, and/or other video. In some cases, a color video may be converted to gray-scale to facilitate separating out the background from the subject, but this is not required. Using gray-scale video may reduce processing power needed to separate the background from the subject as only one channel is required to be processed by comparing corresponding pixels, whereas a color video may typically have three channels (a red channel, a green channel, and a blue channel) for which corresponding pixels may need to be compared to possible pixel values based on a distribution (as discussed below).

Figure 5A:
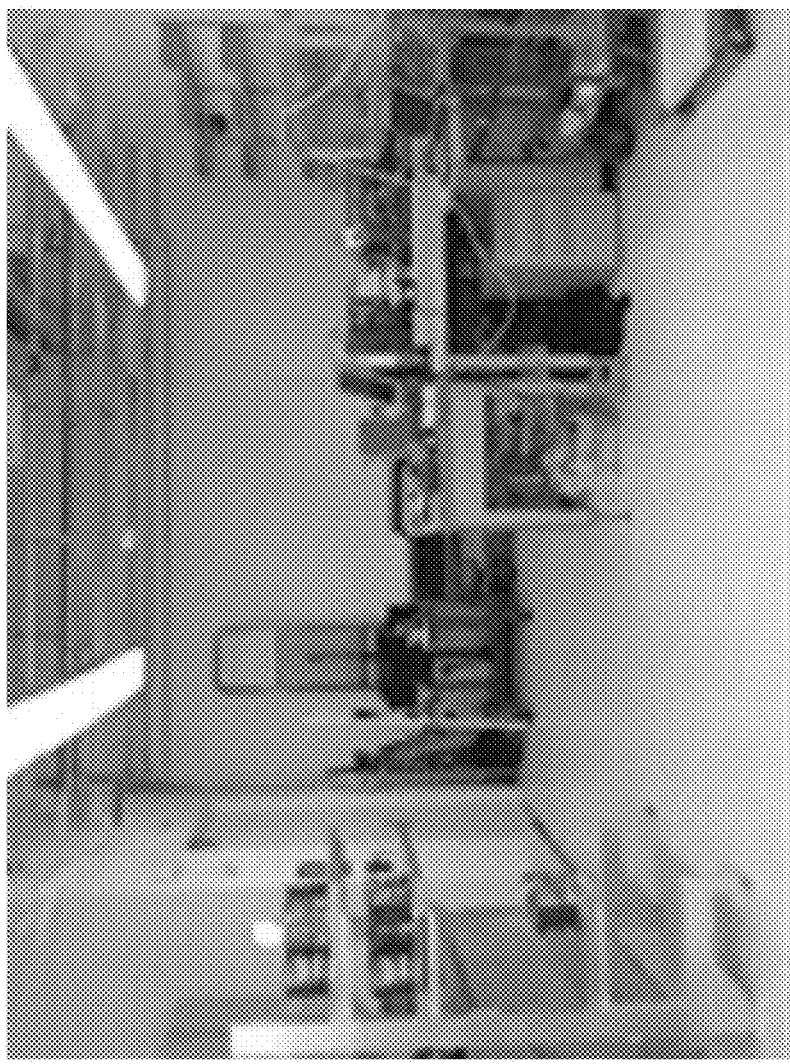
FIG. 5A is an illustrative frame of video used as a reference frame in a monitoring system.
Figure 5B:
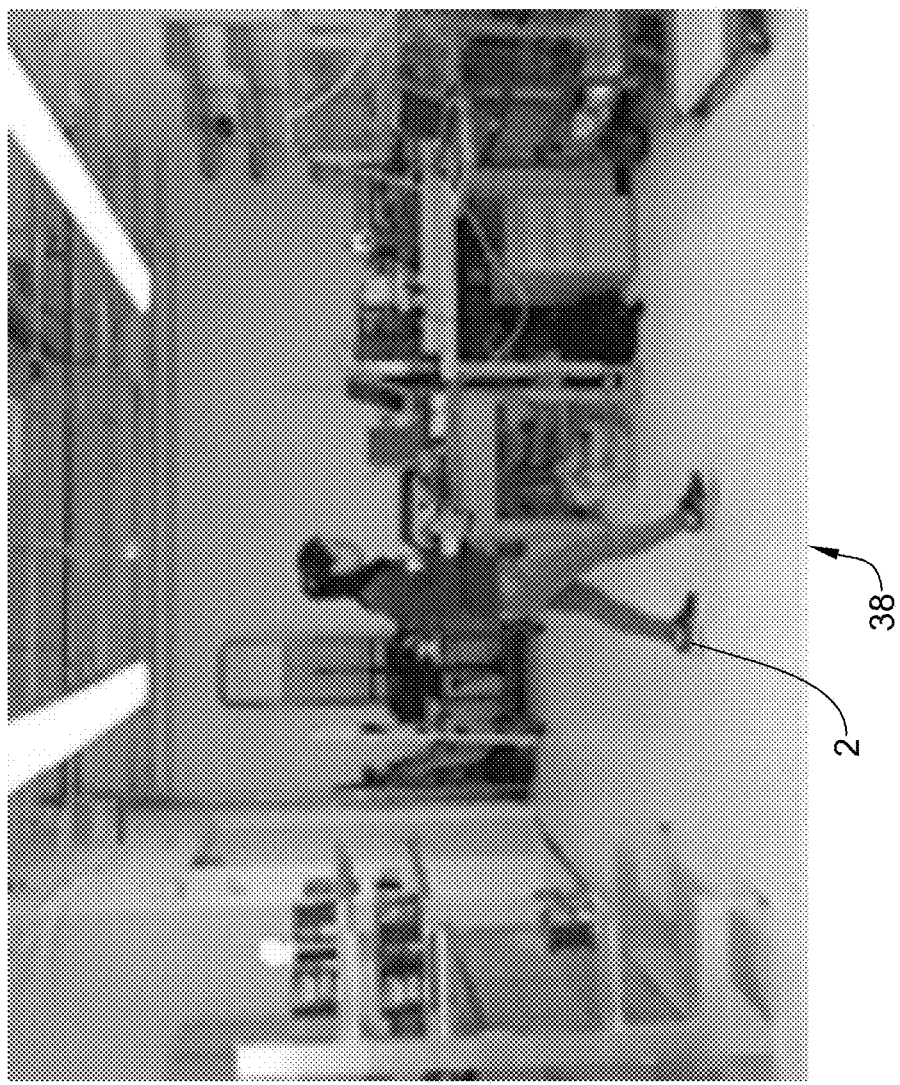
FIG. 5B is an illustrative frame of video that may be compared to the reference frame in FIG. 5A by the monitoring system.

FIGS. 5A and 5B depict frames of a video. In FIG. 5A, a frame having a background 38 is depicted without a subject 2. FIG. 5B is a frame having the subject 2 with the background 38 of or substantially similar to the background 38 in FIG. 5A. One of the frame in FIG. 5A and the frame in FIG. 5B may be considered a reference frame and pixels of the other frame may be compared to corresponding possible pixel values from a distribution developed based on at least the reference frame and each pixel in the other frame may be assigned an indicator of being background or foreground (e.g., a number value, a color (e.g., black or white), etc.) using the segmentation approaches discussed above.

Figure 6:
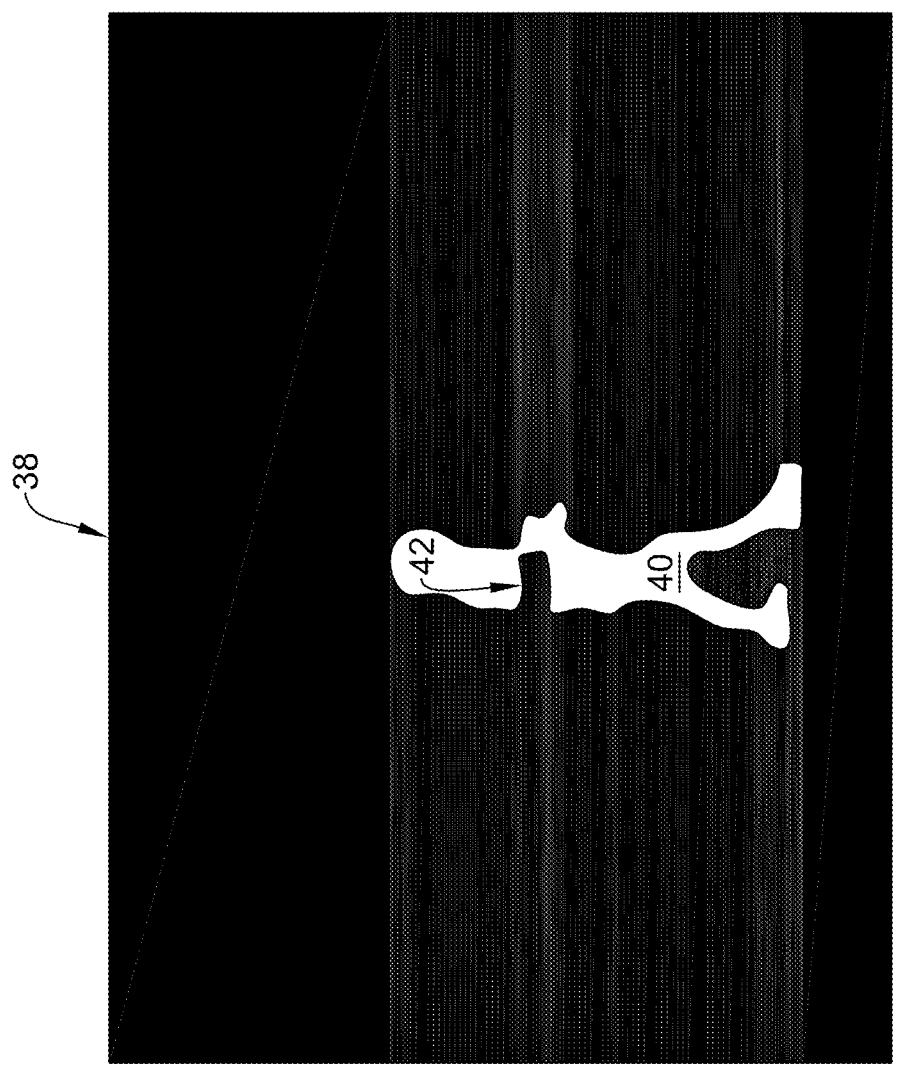
FIG. 6 is a schematic view of an illustrative segmented frame of video depicting a result from comparing the frame of video in FIG. 5B with the reference frame of FIG. 5A.

FIG. 6 depicts a foreground subtraction resulting from segmenting FIG. 5B relative to FIG. 5A. As this may be the beginning of the video, the background may change and the possible background pixel value Gaussian distribution mixture model (e.g., the MOG model or other model) may be of only one distribution component with a mean value of the distribution being the same as the pixel values in FIG. 5A. The appearance of the moving subject in FIG. 5B may not be matched into the corresponding background model and as a result, the pixels of the moving subject may be considered the foreground (e.g., as represented in white as a silhouette 40) and the rest of the pixels may be considered the background (e.g., as represented in black). Although the segmentation is depicted in FIG. 6 with the background being black and the foreground being white, other colors or techniques (e.g., outlining, etc.) may be used to distinguish between a foreground and a background. Alternatively, segmentation may not be depicted and a display may depict the original video during and/or after processing of the video or no video at all.

Although the background in the frames of FIG. 5A and FIG. 5B is static or substantially static, the background subtraction techniques described above may be utilized on dynamically changing backgrounds. In such cases, an initialization of the subject 2 may be done to distinguish the moving subject 2 from other moving objects in the background. Such initialization may be accomplished by manually or automatically applying a bounding box (e.g., as discussed below) to or around the subject and/or may be accomplished in one or more other manners. After the initialization of the subject 2, any objects identified as moving (e.g., through identifying a ghost effect blob) between frames may be compared to the initialized subject 2 in a previous frame and only moving objects matching the initialized subject 2 in the previous frame will be kept as foreground or as the subject 2.

In some cases, the monitoring system 10 may not be able to recognize an entirety of the subject 2, which may result in an incomplete silhouette 40 of the subject 2 (e.g., the silhouette may have one or more holes or gaps 42, as shown in FIG. 6) being produced from comparing pixels of successive frames of video. Such holes or gaps 42 may appear due to noise in the environment (e.g., illumination changes, shadows, etc.) around the background 38 and/or due to a pixel representing part of the subject 2 (e.g., one or more pixels in the frame) that may have an appearance (e.g., intensity value) that is close to that of a pixel of the background 38 in a reference frame, such that the pixel value matches the background model. It is contemplated that the holes or gaps 42 may occur in a silhouette for one or more other reasons.

The holes or gaps 42 in a silhouette 40 may be addressed in one or more manners. In one example, the holes or gaps 42 may be filed through morphological and/or other techniques that fill-in gaps between identified portions of the silhouette 40.

Once the subject 2 has been identified in the video by identifying the silhouette 40, the subject 2 may be bound 106. The subject 2 may be bound 106 using one or more manual and/or automated techniques.

In one example of bounding the subject 2, marginal pixels of the silhouette 40 of the subject 2 in a horizontal direction and in a vertical direction may be identified. That is, an extreme-most pixel of the silhouette 40 in a positive y-direction, an extreme-most pixel of the silhouette 40 in the negative y-direction, an extreme-most pixel of the silhouette 40 in a positive x-direction, and an extreme-most pixel of the silhouette 40 in a negative x-direction may be identified relative to a center of the silhouette 40. A height dimension of the silhouette 40 may be identified by taking a difference of a vertical coordinate location on the grid of the frame for the extreme-most pixel of the silhouette 40 in the positive y-direction and a vertical coordinate location on the grid of the frame for the extreme-most pixel of the silhouette 40 in the negative y-direction. A width dimension of the silhouette 40 may be identified by taking a difference of a horizontal coordinate location on the grid of the frame for the extreme-most pixel of the silhouette 40 in the positive x-direction and a horizontal coordinate location on the grid of the frame for the extreme-most pixel of the silhouette 40 in the negative x-direction. The height dimension and the width dimension of the silhouette 40 may be used as or assigned as a height dimension and width dimension, respectively, of the subject 2.

Figure 7:
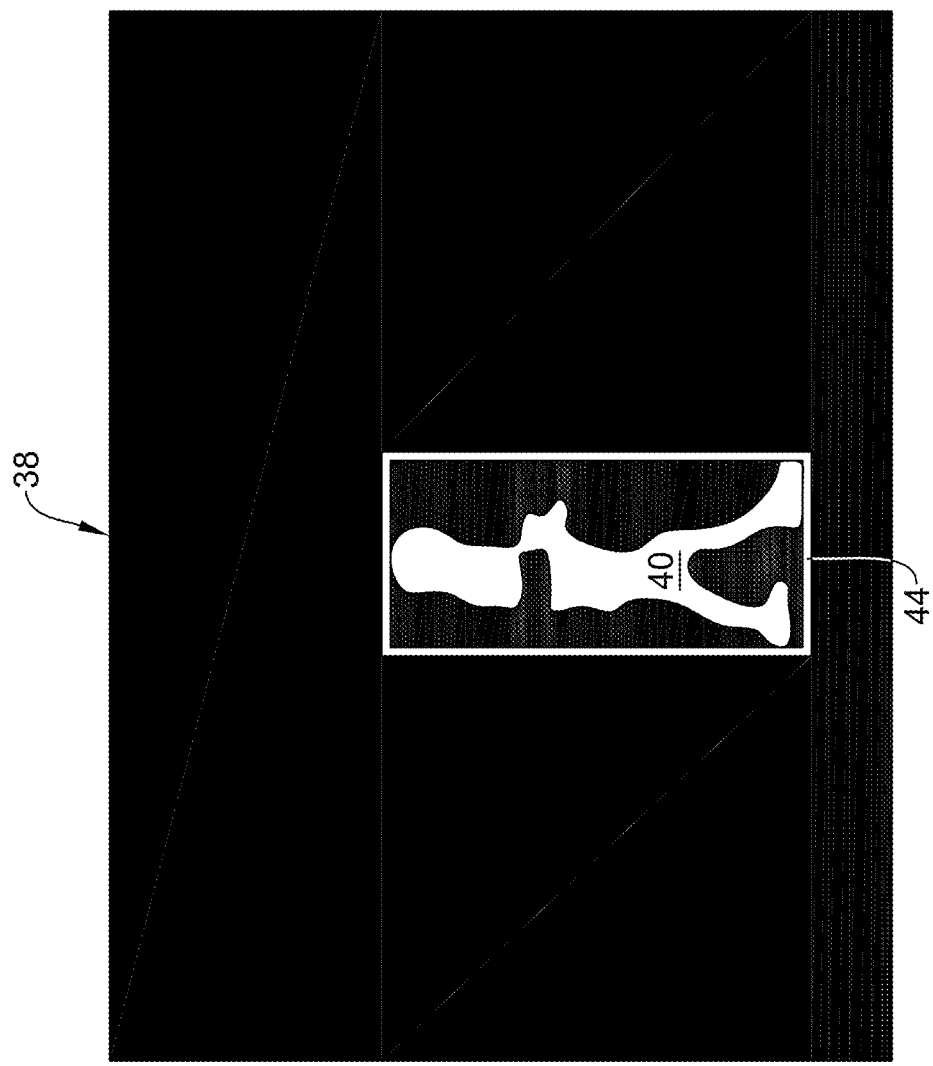
FIG. 7 is a schematic view of an illustrative segmented frame of video with a bounding box applied around an identified subject.

Alternatively, or in addition, the subject 2 may be bound 106 by applying a bounding box 44 around silhouette 40, as shown in FIG. 7. The bounding box 44 may be applied close around the silhouette 40. In some cases, an edge of the bounding box 44 may tangentially pass each of the marginal pixels of the silhouette 40 in a positive y-direction, a negative y-direction, a positive x-direction, and a negative x-direction relative to a center of the silhouette 40. Alternatively or in addition, the bounding box 44 may be applied around the silhouette 40 to bound the subject 2 so as to extend through one or more other pixels of the silhouette 40 and/or the background 38. The height and width dimensions of the bounding box 44 may be equal to or may be indicative of a height dimension and width dimension of the silhouette 40. Similar to as discussed above, the height dimension and/or the width dimension of the bounding box 44 may be used as or assigned as a height dimension and a width dimension, respectively, of the subject 2. Further, in some cases, the height and width dimensions of the bounding box 44 may be indicative of an object 4 location, a hand location of the subject 2, and/or other parameter values.

Figure 8C:
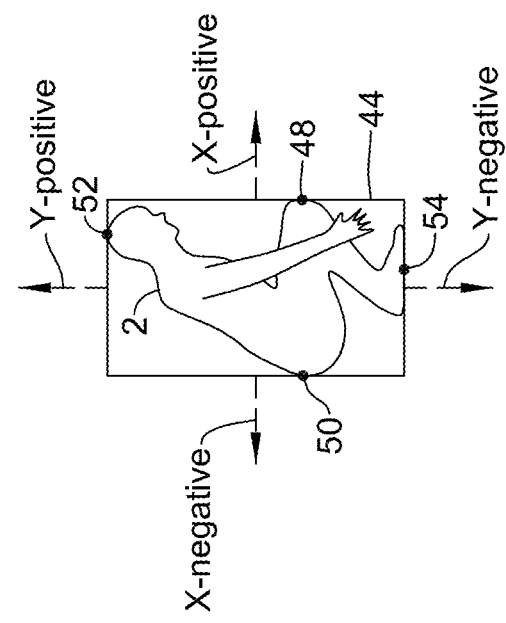
FIGS. 8A-8C depict subjects in different illustrative orientations, where the subjects are bound by a bounding box.
Figure 8B:
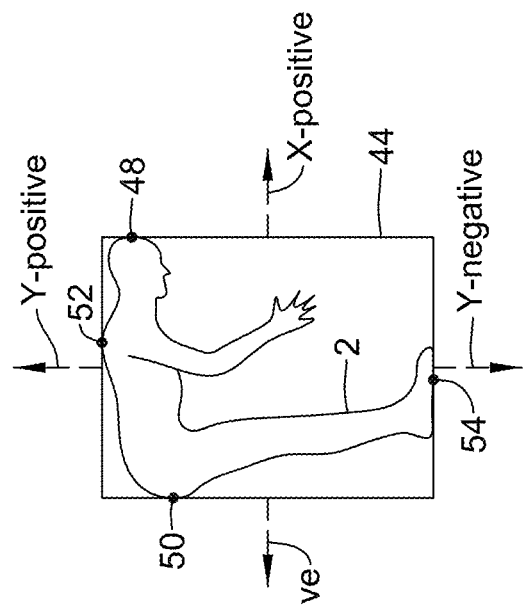
Figure 8A:
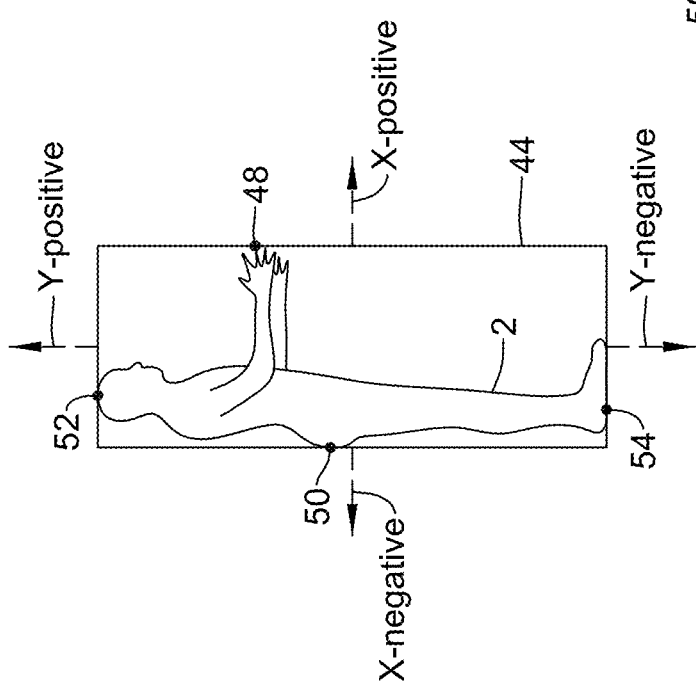

FIGS. 8A-8C depict the subject 2 in three different postures, respectively, with a bounding box 44 and identified locations of marginal pixels. In FIG. 8A, the subject 2 is in a standing position or posture, in FIG. 8B the subject 2 is in a stooping position or posture, and in FIG. 8C the subject 2 is in a squatting position or posture. Each of FIG. 8A, FIG. 8B, and FIG. 8C depict a coordinate system 46 relative to a center of a height and width of the subject 2. The coordinate system 46 is depicted for descriptive (e.g., relational) purposes only and is not necessarily part of the monitoring system 10. Further, FIGS. 8A-8C depict a marginal pixel 48 in the x-positive direction, a marginal pixel 50 in the x-negative direction, a marginal pixel 52 in the y-positive direction, and a marginal pixel 54 in the y-negative direction. Then, optionally, the bounding box 44 may be applied around the subject 2 (or the silhouette 40 of the subject 2) tangential to or otherwise relative to the marginal pixels 48, 50, 52, 54.

As can be seen from FIGS. 8A-8C, each of the respective orientations or postures of the subject 2 correspond to a different height and width dimension of the subject 2 or bounding box 44. It has been found that a height and a width of a subject 2 or bounding box 44 correlates with an orientation (e.g., posture or other orientation) of the subject 2 and/or other parameters relative to the subject 2. As such, in a lifting analysis, the height and width dimension of the subject 2 or the bounding box 44 may be utilized to determine or predict at least the orientation of and/or the posture of the subject 2 and to determine injury risks for the subject without complex linkage algorithms, sensors and sensor data, and manual measurements (e.g., hip and/or knee angles, etc.).

Figure 9:
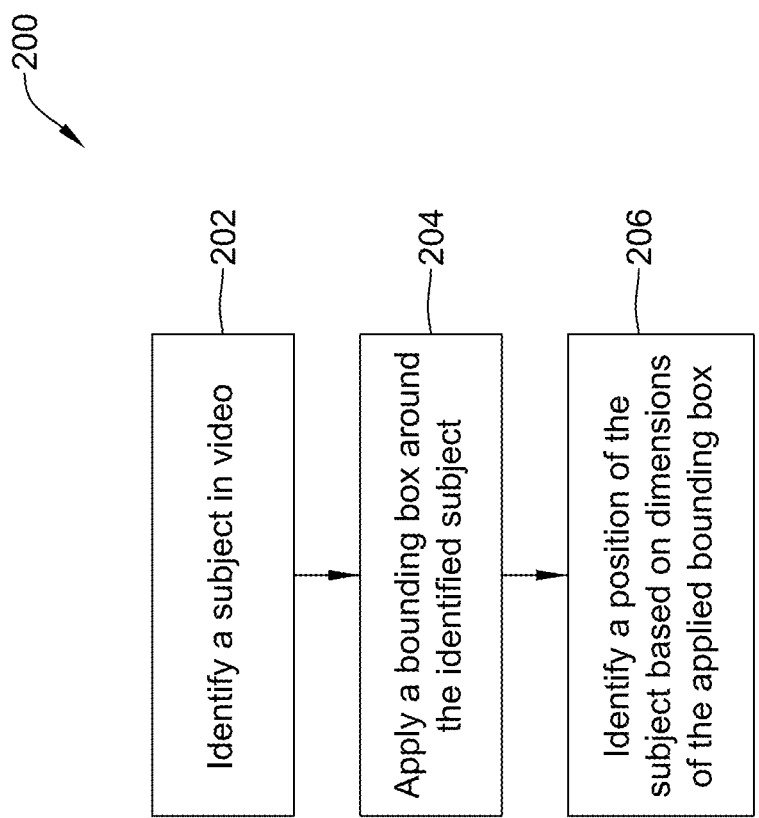
FIG. 9 is a schematic flow diagram of an illustrative method of identifying a parameter of a subject.

FIG. 9 is a flow diagram of an approach 200 for determining an orientation of a subject (e.g., the subject 2 or other suitable subject). The approach 200 may include identifying 202 a subject in video. The subject may be identified in a manner similar to as discussed above with respect to the step 104 of the approach 100 and/or in one or more other manners.

Once the subject has been identified, a bound may be applied 204 to and/or around the identified subject. The bound may be a bounding box (e.g., the bounding box 44) and may be applied in a manner similar to as discussed above with respect to the step 106 of the approach 100. In some cases, the identified subject may be bound in one or more other manners including, but not limited to, identifying marginal pixels of the identified subject in a horizontal direction and in a vertical direction without defining a bounding box.

When the subject has been bound, dimensions (e.g., height and width dimensions in pixels or other units and/or other suitable dimensions) of the subject in a frame of video may be determined from the dimensions of the bound of the subject (e.g., dimensions of the bounding box and/or dimensions from differencing the marginal pixels in the vertical direction and differencing the marginal pixels in the horizontal direction). In one example, the height and width dimensions of the bound of the subject may be directly assigned as the height and width dimensions of the subject. Alternatively or in addition, the height and width dimensions of the subject may be determined from or assigned based on one or more different functions of the dimensions of the bound of the subject. Based, at least in part, on the height and width dimensions of the identified subject that are obtained from bounding the subject or are obtained in one or more other suitable manners, a parameter of the subject may be identified 206 (e.g., a posture, orientation, and/or one or more other suitable parameters of the subject may be predicted). Thus, as discussed above, parameter information may be extracted and/or predicted from video without the use of complex linkage models used in some motion tracking techniques and without taking complex measurements of angles of portions of the subject relative to other portions of the subject.

In some cases, a posture of the subject may be determined from the subject's identified and/or assigned dimensions based on one or more of the dimensions of the bound in one or more suitable manners. In one example, the posture of the subject may be determined based on the subject's determined height dimension and the subject's determined width dimension, but other dimensions of the subject may be additionally and/or alternatively used. In some cases, the posture and/or other parameter of the subject may be determined in real time (e.g., in real time during recording of video and/or during playback of video).

When determining the subject's posture based on the subject's identified or assigned height dimension and width dimension, the height and width dimensions of the subject may be normalized. In one example, the height and width dimensions of the subject may be normalized based on a standing height of the subject (e.g., a normalizer) to obtain a normalized height of the subject and a normalized width of the subject. Normalizing the height of the subject and the width of the subject may include dividing the height of the subject by the normalizer and dividing the width of the subject by the normalizer. Alternatively or in addition, the height and the width dimensions of the subject may be normalized in one or more other suitable manners. Normalizing the dimensions of the subjects analyzed in video may facilitate accounting for varying anthropologies among the subjects having their movements analyzed.

Although other postures of the subject may be identified, a standing posture, a stooping posture, and a squatting posture (e.g., see FIG. 8A-8C for depictions of these postures) may be a focus of posture analysis due to the relevance of these postures in the NIOSH lifting equation and/or the ACGIH TLV for manual lifting, among other analyses. Generally, whether a person (e.g., the subject) is in a standing posture, a stooping posture, or a squatting posture may be determined from a knee bend angle and trunk bend angle. In one example, when the person has a knee bend angle that has not reached or gone beyond (e.g., is less than) one hundred thirty (130) degrees, the person may be considered to be in a squatting posture. When the person has a knee bend angle that has reached or gone beyond (e.g., is equal to or greater than) one hundred thirty (130) degrees and a trunk bend angle (e.g., a hip bend angle) that has reached or gone beyond forty (40) degrees, the person may be considered to be in a stooping posture. When the person has a knee bend angle that has reached or gone beyond one hundred thirty (130) degrees and a trunk bend angle that has not reached or gone beyond forty (40) degrees, the person may be considered to be in a standing position. As discussed above, however, it may be difficult to track bending angles of a subject in video due to such tracking requiring sensors, manual identification, and/or complex limb tracking algorithms and as a result, it may be difficult to determine postures of monitored subjects in frames of video.

As referred to above, an additional or alternative technique for identifying standing, stopping, and squatting postures of a subject in frames of video that does not require tracking of bending angles of a subject in video, use of sensors, use of manual identification, or use of complex limb tracking algorithms may include determining these postures based on one or both of the subject's height and width dimensions. In some cases, a value based on the height dimension of the subject and a value based on the width dimension of the subject (e.g., the height and width dimensions of the subject, normalized height and width dimensions of the subject, and/or other values based on the height and width dimensions of the subject) may be compared to one or more height thresholds and one or more width thresholds, respectively, to determine the subject's posture.

Figure 10:
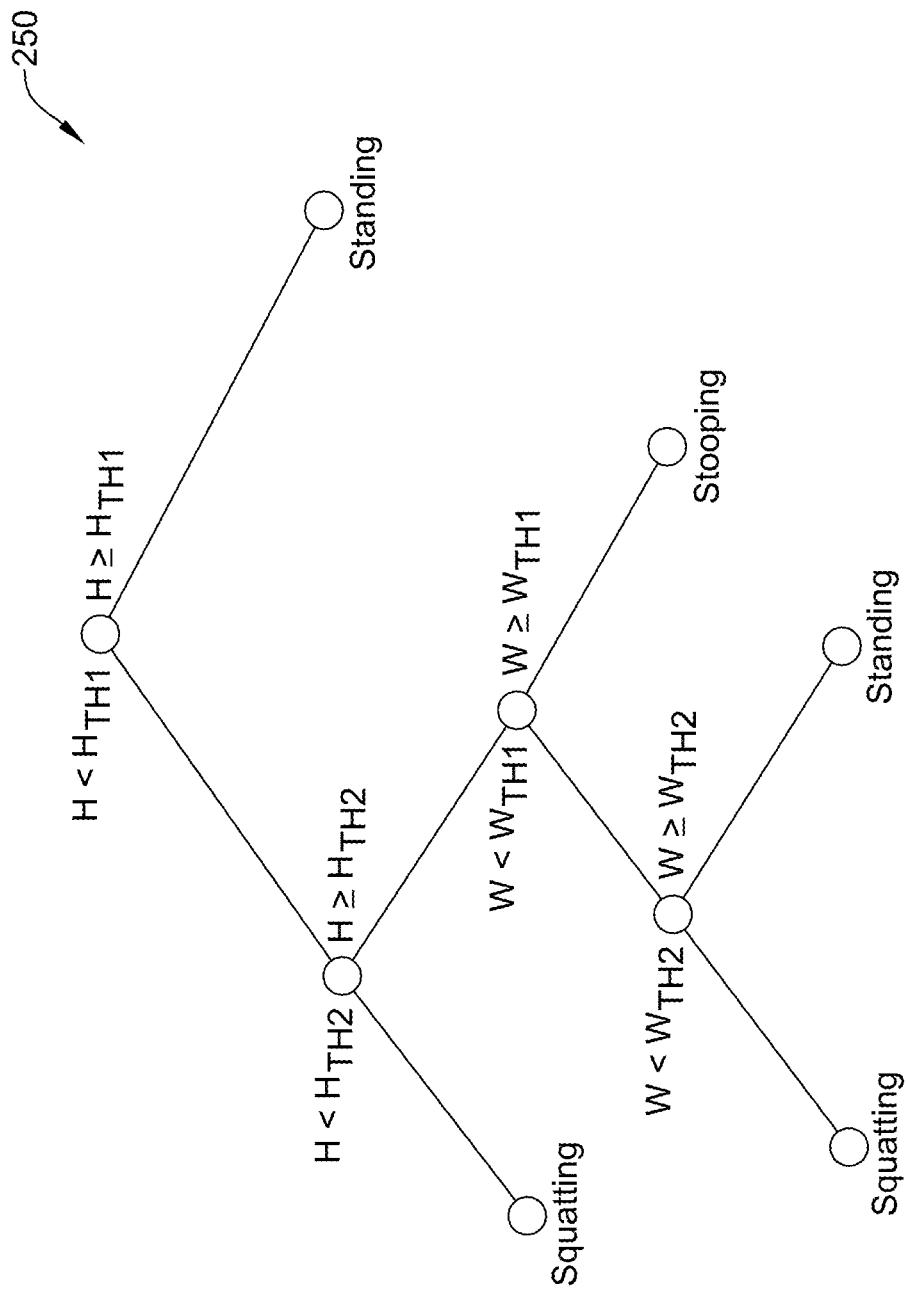
FIG. 10 is a schematic diagram of an illustrative decision tree technique for comparing values to thresholds.

When determining whether a subject in a frame of video is in a standing posture, a stooping posture, or a squatting posture, the value based on the height of the subject may be compared to a first height threshold and a second height threshold and the value based on a width of the subject may be compared to a first width threshold and a second width threshold. The values based on the dimensions of the subject may be compared to thresholds using one or more suitable techniques and in one or more suitable orders. In some cases, a technique using a decision tree 250, as shown in FIG. 10 for example, may be utilized. Additional or alternative techniques for comparing the values based on the dimensions of the subject to thresholds may include, but are not limited to, look up tables, algebraic equations, and/or other suitable techniques.

In an example using a decision tree, such as when the decision tree 250 is utilized, an analysis may start at a top of the decision tree 250 and initially the value based on the height of the subject may be compared to the first height threshold $H_{TH1}$. When the value based on the height of the subject has reached or gone beyond (e.g., is equal to or greater than) the first height threshold Elm, the subject may be classified as being in and/or may be assigned a standing posture. When the value based on the height of the subject has not reached or gone beyond the first height threshold Elm, then the value based on the height of the subject may be compared to the second height threshold $H_{TH2}$. When the value based on the height of the subject has not reached or gone beyond (e.g., is less than) the second height threshold $H_{TH2}$, the subject may be classified as being in and/or may be assigned a squatting posture. When the value based on the height of the subject has not reached or gone beyond the first height threshold Elm and has reached or gone beyond the second height threshold $H_{TH2}$, a value based on the width of the subject may be compared to the first width threshold $W_{TH1}$. When the value based on the width of the subject has reached or gone beyond the first width threshold $W_{TH1}$, the subject may be classified as being in and/or may be assigned a stooping posture. When the value based on the height of the subject has not reached or gone beyond the first height threshold Elm and has reached or gone beyond the second height threshold $H_{TH2}$ and the value based on the width of the subject to has not reached or gone beyond the first width threshold $W_{TH1}$, the value based on the width of the subject may be compared to the second width threshold $W_{TH2}$. When the value based on the width of the subject has reached or gone beyond the second width threshold $W_{TH2}$, the subject may be classified as being in and/or may be assigned a standing position. When the value based on the width of the subject has not reached or gone beyond the second width threshold $W_{TH2}$, the subject may be classified as being in and/or may be assigned a squatting position. Using a decision tree technique for comparing values based dimensions to dimension threshold values may result in an efficient determination of posture information for a monitored subject.

Values of the threshold values related to height and width of the subject may be suitable values related to a type of value that is used for the values based on the height and width dimensions of the subject. For example, when the values based on the height and width dimensions are normalized using a normalizer of a standing height of a subject in the example above, the first height threshold $H_{TH1}$ may be a value in a range from about 0.90 to about 0.95, the second height threshold $H_{TH2}$ may be a value in a range from about 0.63 to about 0.68, the first width threshold $W_{TH1}$ may be a value in a range from about 0.64 to about 0.69, and the second width threshold $W_{TH2}$ may be a value in a range from about 0.51 to about 0.57. In one example, the first height threshold $H_{TH1}$ may be a about 0.93, the second height threshold $H_{TH2}$ may be about 0.66, the first width threshold $W_{TH1}$ may be about 0.67, and the second width threshold $W_{TH2}$ may be about 0.54. Other values for thresholds used in determining a posture of a subject are contemplated.

In addition to or as an alternative to being able to extract posture information and/or other information from video to assess injury risk or for another purpose, it may be useful to be able to locate 108 the hands of the subject, particularly at a beginning of a task (e.g., when the subject is in a loading state) and at an ending of the task (e.g., when the subject is in an unloading state). Hand location may be determined in any manner. In some cases, the hands of the subject may be initialized, recognized, and/or tracked manually or by software (e.g., in an automated manner), however, these techniques may require the training of a continuous hand detector and may result in error because the hand of a subject is small (e.g., 20×10 pixels in video) and difficult to differentiate from other portions of the subject. Moreover, tracking of the hand through each frame of video may require more processing power than it is desirable to devote to tracking the hands.

As hand location at the beginning and ending of a task may be useful information for an assessment of the subject 2 performing the task, a technique has been developed to identify the hands of the subject during frames when a task starts and when a task ends without necessarily searching for and tracking the hand through all or substantially all frames of the video and without specifically identifying the hands. In some cases, such a technique may utilize identifying "ghost effects" when the subject 2 loads and/or unloads the object 4.

A ghost effect may be a set of connected and/or adjacent points (e.g., a set of pixels in a frame) detected as being in motion, but not corresponding to any real moving objects. Such a definition of "ghost effects" is discussed in Shoushtarian, B. and Bez, H. "A practical adaptive approach for dynamic background subtraction using an invariant colour model and object tracking." Pattern Recognition Letters, January 2005, 26(1):5-26, Jan. 2005, which is hereby incorporated by reference in its entirety. For example, a ghost effect may be a cluster of pixels that represents an appearance of a static object or a region of a scene where these pixels look different in a current frame than in one or more immediately previous frames. The ghost effect may appear and then disappear into background after the background model learns and updates the new appearance of these pixels over a plurality of frames.

As such, in some cases, the ghost effects may be considered to be a by-product of the background subtraction technique discussed above and may be utilized to identify when a task begins and/or ends, along with a location of the hands of the subject when the task begins and/or ends. For example, as the background subtraction technique may update the background model (e.g., the Gaussian distribution background model, MOG) over two or more frames to adapt for backgrounds that are not static, it may take several frames for a moving object 4 to be considered background after the moving object 4 stops (e.g., becomes static) and/or is separated from the subject 2. Similarly for a static object 4 that starts to move, the location where the object 4 was may take several frames to be considered background. As a result of this delay in recognizing what is background and what is foreground, a location of a moving object 4 after it stops moving (e.g., an ending location) and/or a location of a static object 4 before it begins moving (e.g., a beginning location) may show up as a blob or ghost effect in a frame of video.

One case in which a ghost effect may occur is when a static object is moved and values of pixels at the region where the object was static become different from estimated values of the pixel based on a background model for pixels at the region and thus, that region may be considered to be foreground and/or depicted as such in a frame. The background model may then take several (e.g., two or more) frames to learn the new static appearance of that region and absorb the pixels of that region into the background model. That is, before the background model updates, the pixels of the region where the object was static are labeled as foreground and are considered to depict a ghost effect.

Another case where a ghost effect might occur is when a moving object becomes static. A region where the object stops may change its appearance from a previous appearance when the object was not present (e.g., the background) into an appearance associated with a subject or moving object (e.g., the foreground). As the background model of the region is built up with only pixel values for the previous appearance for when the object was not present in the region, a new presence of the static object in the region may be considered to be foreground. The background model may then take several frames to learn the new static appearance of the region with the newly received object and absorb the pixels of that region into the background model. Before the background model updates, the pixels of the region where the object stopped moving may be labeled as foreground and/or may be considered a ghost effect.

Further and as discussed in greater detail below, the ghost effects 56, as shown for example in FIGS. 11A-11D, 13, and 14, may be detected, and a subject's hand location may be determined from the detected ghost effects 56, by looking for clusters of foreground pixels in a frame of video that were not present in a reference frame or frames of the video. In some cases, ghost effects 56 may be identified when clusters of pixels satisfy certain principles. The principles may include, among other principles, consistency in time (e.g., a cluster of pixels show up in the same location in the following N frames), gradual vanishing (e.g., a size of a cluster should be no larger than a size of the object and may gradually become smaller over a set of frames), the subject 2 is in close proximity to the cluster of pixels when the cluster of pixels are initially identified, and a number of frames it may take for a cluster of pixels to become background is consistent with an expected number of frames for the ghost effect 56 to disappear. To be considered a ghost effect 56, a cluster of pixels may need to satisfy one, some, or all of the above referenced principles and/or other principles.

Figure 11A:
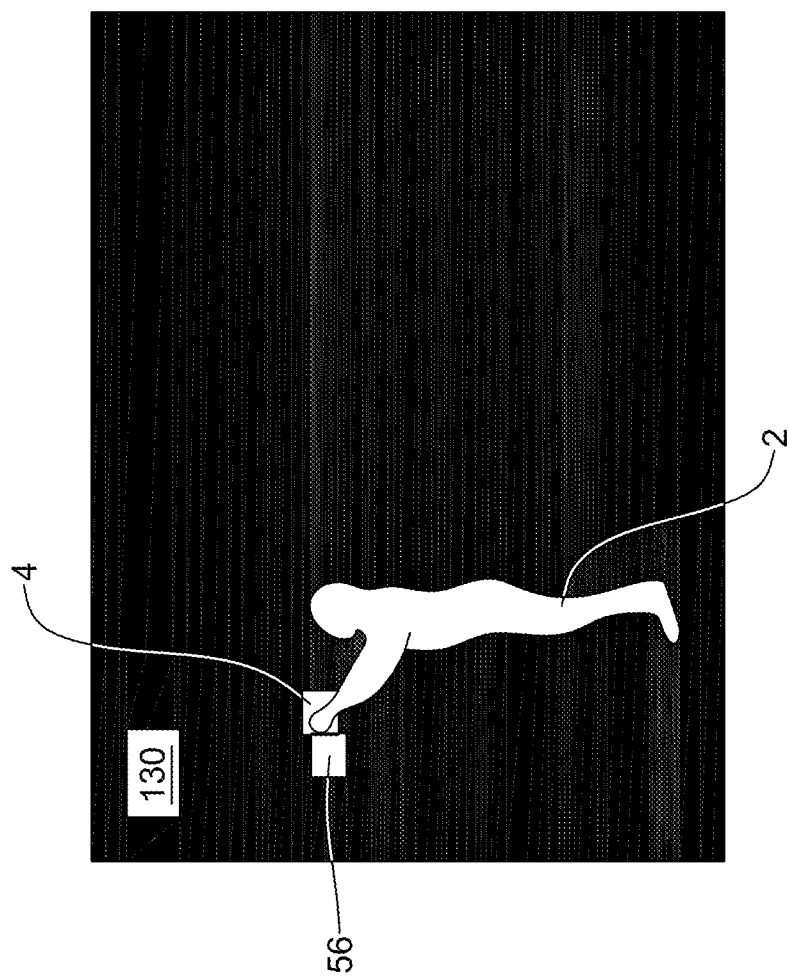
FIGS. 11A-11E are schematic views of illustrative segmented frames of video showing an illustrative ghost effect appearing and disappearing in the frames of video over time.
Figure 11B:
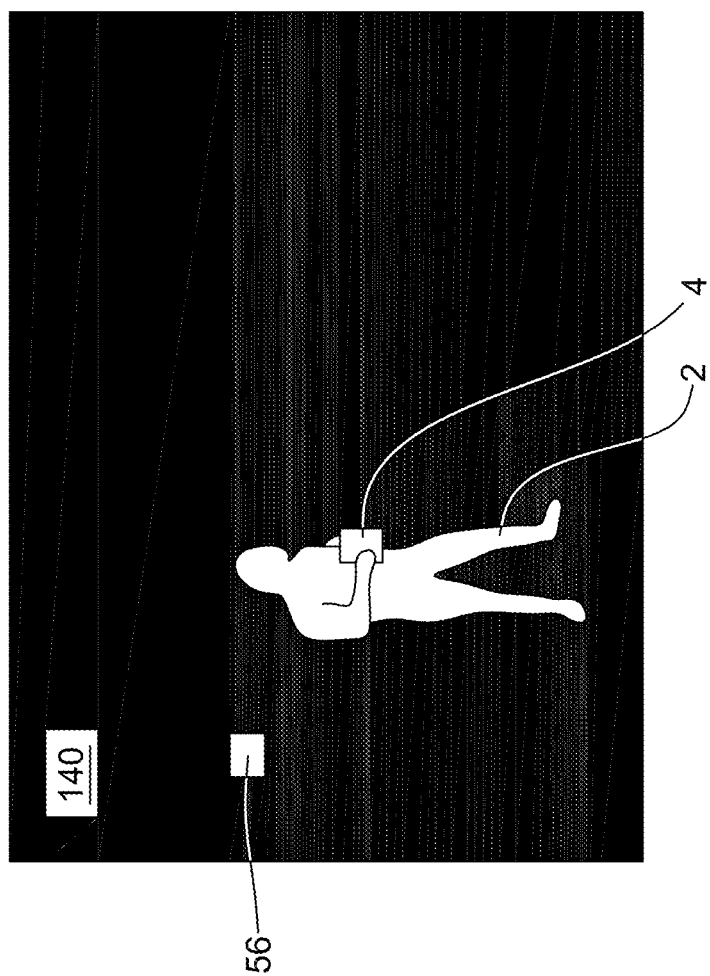
Figure 11C:
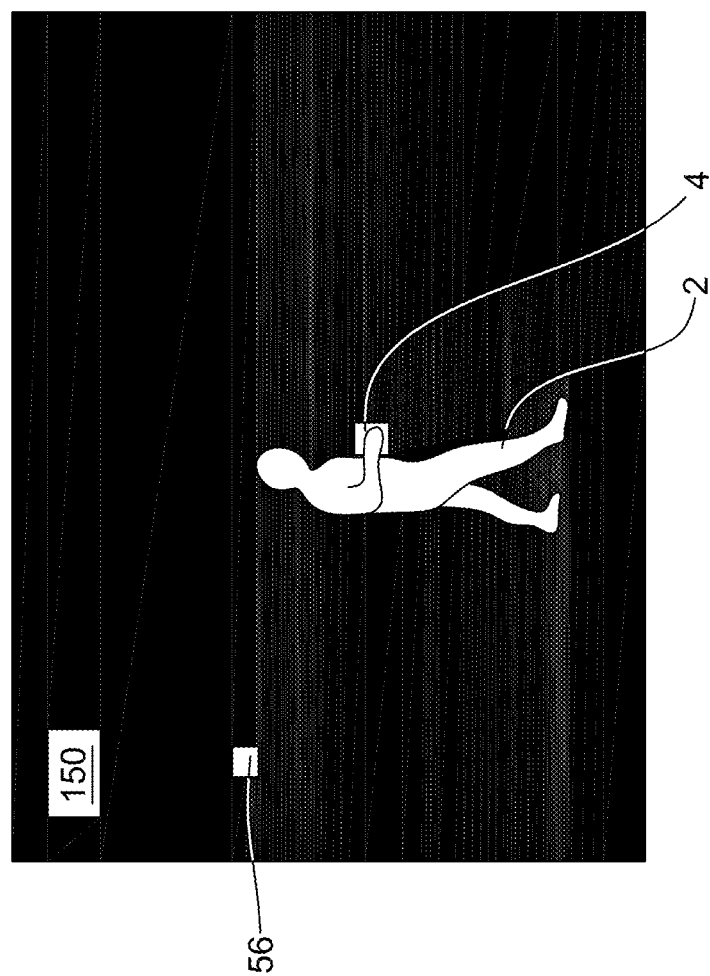
Figure 11D:
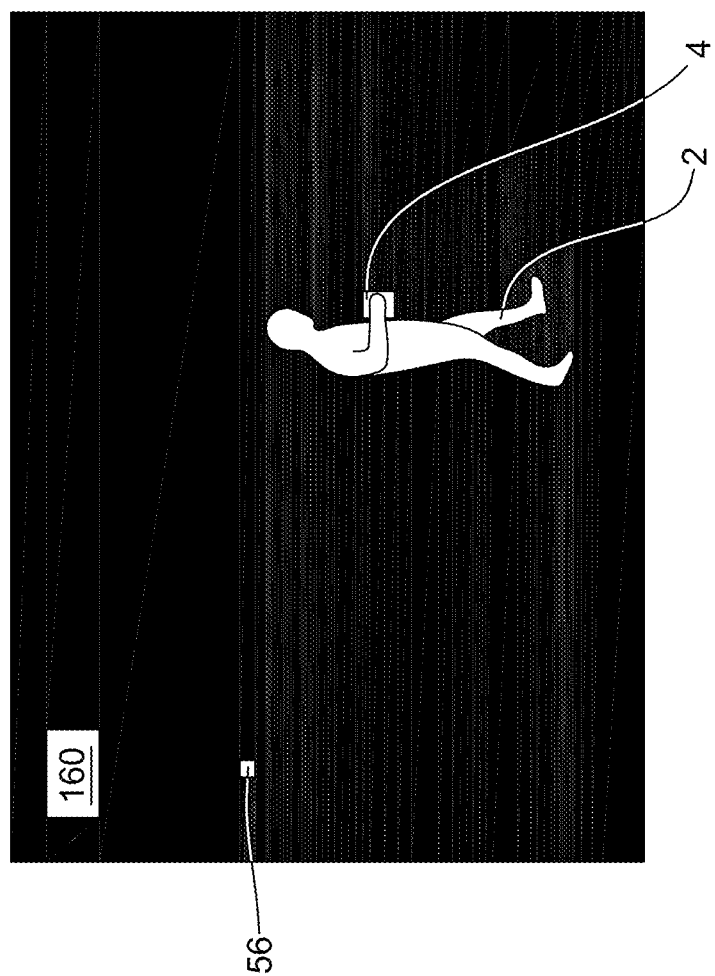
Figure 11E:
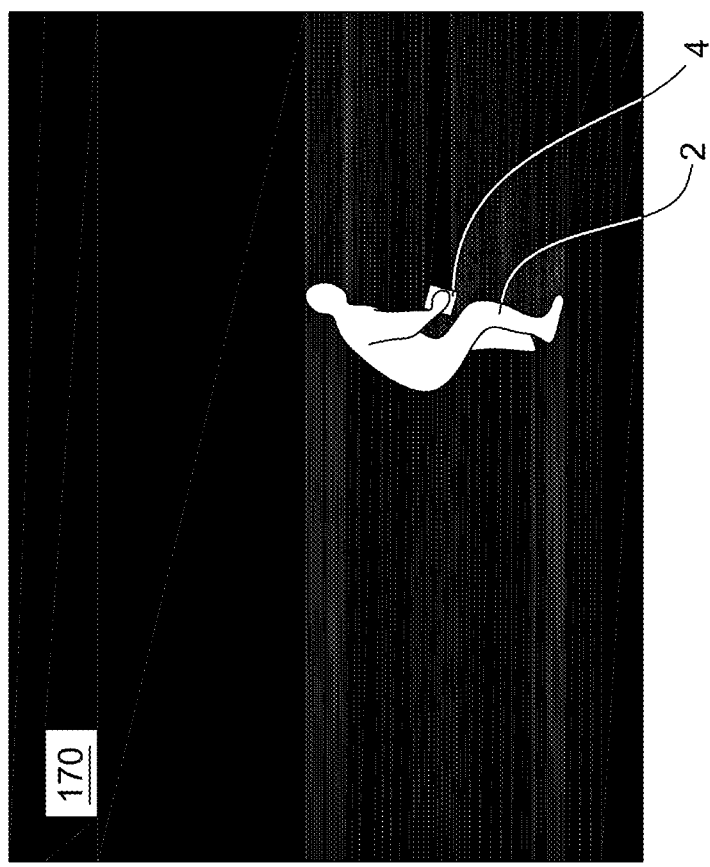

FIGS. 11A-11E depict example frames with the subject 2 and the ghost effect 56 as the ghost effect 56 is first identified and fades away over time. FIG. 11A depicts a frame with the ghost effect 56 near in time to when the ghost effect initially appears and the subject 2 picks up the object 4. Ten (10) frames after the frame of FIG. 11A, the frame of FIG. 11B depicts the ghost effect 56 being separate from the subject 2 and object 4. Ten (10) frames after the frame of FIG. 11B, the frame of FIG. 11C depicts the ghost effect 56 starting to fade into the background. Ten (10) frames after the frame of FIG. 11C, the frame of FIG. 11D depicts the ghost effect 56 almost completely faded into the background. Ten (10) frames after the frame of FIG. 11D, the frame of FIG. 11E no longer depicts the ghost effect 56. Although FIGS. 11A-1E depict the ghost effect 56 completely or substantially disappearing into the background after fifty (50) frames, the ghost effect 56 may be configured to be depicted for a longer or shorter amount of time (e.g., in more or fewer frames).

As a ghost effect 56 may initially occur at a beginning of task (e.g., when an object starts to move) and/or at an end of a task (e.g., when an object first becomes stationary and separated from the subject 2) and a subject's 2 hands may be at the location of a ghost effect to move the object at the beginning of a task and at the location of a ghost effect to place the object at the ending of a task, a hand location of the subject 2 may be determined (e.g., inferred) from a location of the ghost effects 56. A first frame in which a ghost effect 56 is identified (e.g., a first frame in a sequence of frames in which the ghost effect 56 appears) and a position of the ghost effect 56 in the first frame may be a recorded as the time of a beginning or ending of a task and a location of the hands of the subject 2 at that time, respectively.

Although not required, a determination of the frame(s) where the task may start and/or end may be based at least partially on information known about a task. For example, as it may be known that the subject 2 or a portion of the subject 2 performing a repetitive task reverses direction after starting and/or ending the task, a start and an end of a task may be initially identified or confirmed by tracking a horizontal location of the subject in the frames of the video.

The horizontal motion of the subject 2 may be tracked through successive frames in one or more manners and without sensors on the subject 2. In one example, a mass center of the subject or a silhouette 40 of the subject 2 or other feature may be tracked to determine a horizontal location of the subject 2 throughout the video and when the subject 2 reverses direction. In some cases, a median filter or other filter may be applied to the tracking data to more consistently track the subject 2, as ghost effects (described in greater detail below) of objects (e.g., the object 4 or other objects) held by the subject 2 may bias the mass center of the silhouette of the subject in one direction or another.

Figure 12:
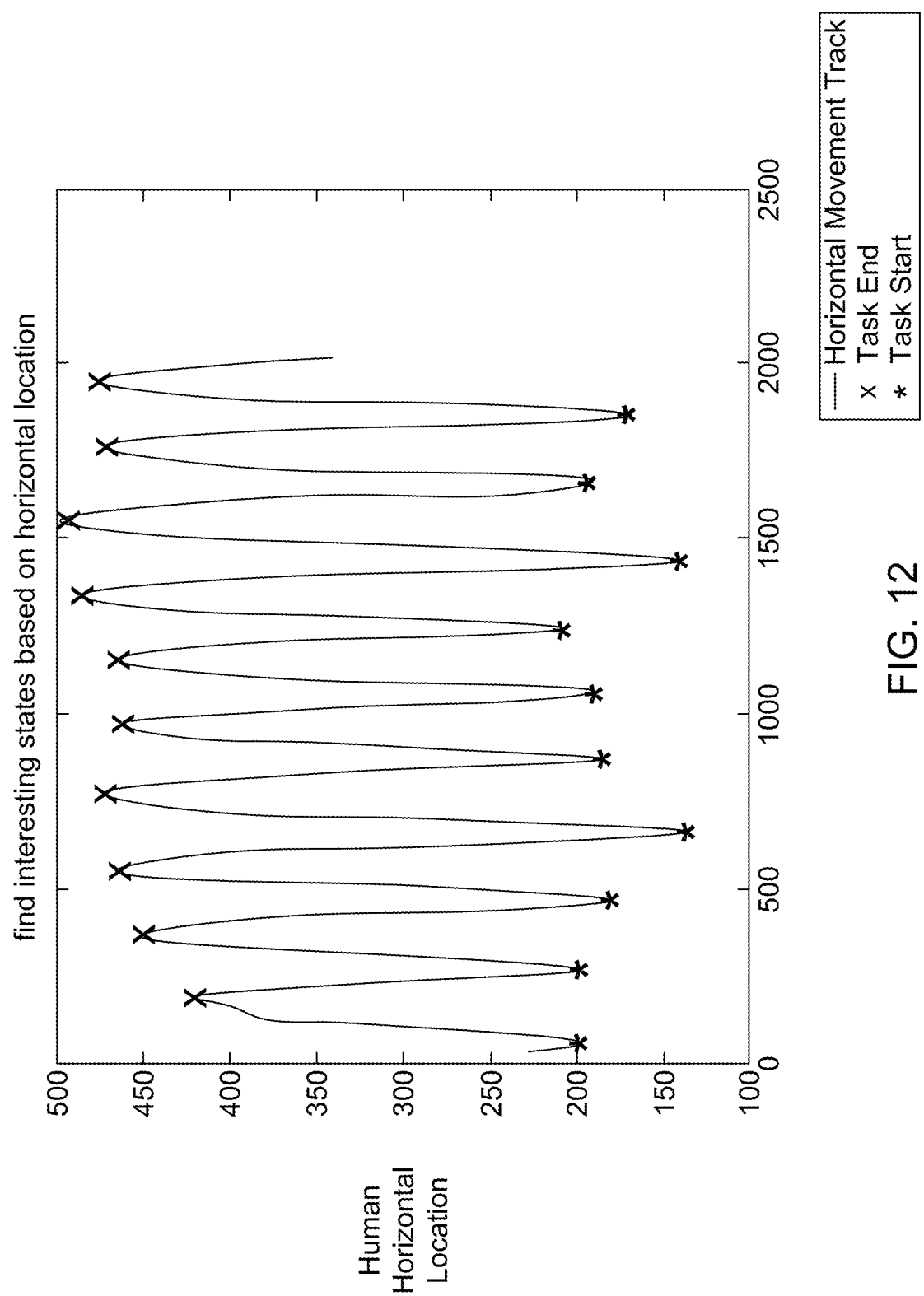
FIG. 12 is a chart depicting illustrative tracked horizontal movement of a subject in video.

FIG. 12 is an illustrative plot of tracked horizontal motion of the silhouette 40 of the subject 2 during a task that is repeated over time. Because the task is repeated, beginning and ending of individual tasks may occur at local extremes. In FIG. 12, a beginning of an individual task may be represented at a first reversal of horizontal movement by a "*" and an ending of an individual task may be represented at a second reversal of horizontal movement by an "". The frame(s) of the video associated with the timing of the "*" may be the beginning of a task and the frame(s) of the video associated with the timing of the """ may be the end of the task. Although tracking the horizontal motion of the subject 2 may be utilized to help determine when a beginning of a task or an ending of a task occur, this step is optional.

The monitoring system 10 may search for an object appearing on a portion of the frame (e.g., the ghost effect 56 of the object 4), which may optionally occur after determining frames around the time a task begins and/or ends, but it is not required to determine or identify frames around when a task begins and/or ends to search for and/or identify an object appearing on a portion of the frame. In some cases, if it is known that a task begins on a left side of a frame of video, the monitoring system 10 may look for the object or ghost effect appearing in the left side of the frame. Similarly, if it is known that a task ends on a right side of the frame, the monitoring system 10 may look for the object or ghost effect to be left in the right side of the frame. If it is not known where in a frame a task is expected to begin and/or end, the monitoring system 10 may look for the object or ghost effect in the entire frame.

Once the locations of the hands of a subject 2 during a beginning and/or an ending of a task are identified, a vertical and/or horizontal distance between the locations of the hands and a location of the feet of the subject 2 may be determined. When the monitoring system 10 is performing a task analysis, such as a lifting analysis, the vertical and horizontal distances between the feet and hands when loading and unloading an object may be necessary to calculate a recommended weight limit and/or may be utilized by the monitoring system to perform other analyses.

Although the monitoring system 10 may determine a hand location as discussed above, a location of the feet within the frame(s) of video may need to be determined. The vertical location of the feet may be considered to be the same as the base of the bounding box (e.g., a margin pixel in the negative y-direction). The horizontal coordinate of the feet location may be determined in one or more manners including, but not limited to, by using a weighted sum of a horizontal silhouette pixel index. The horizontal silhouette pixel index is, for example:

$$FeetCenter_{horizontal} = \frac{\sum_{i=most\ left\ pixel\ index}^{most\ right\ pixel\ index} i \times weight_i}{\sum_{i=most\ left\ pixel\ index}^{most\ right\ pixel\ index} weight_i} \quad (3)$$

The $weight_i$ may be the total number of pixels that is covered by the silhouette 40 at corresponding horizontal index i.

Figure 13:
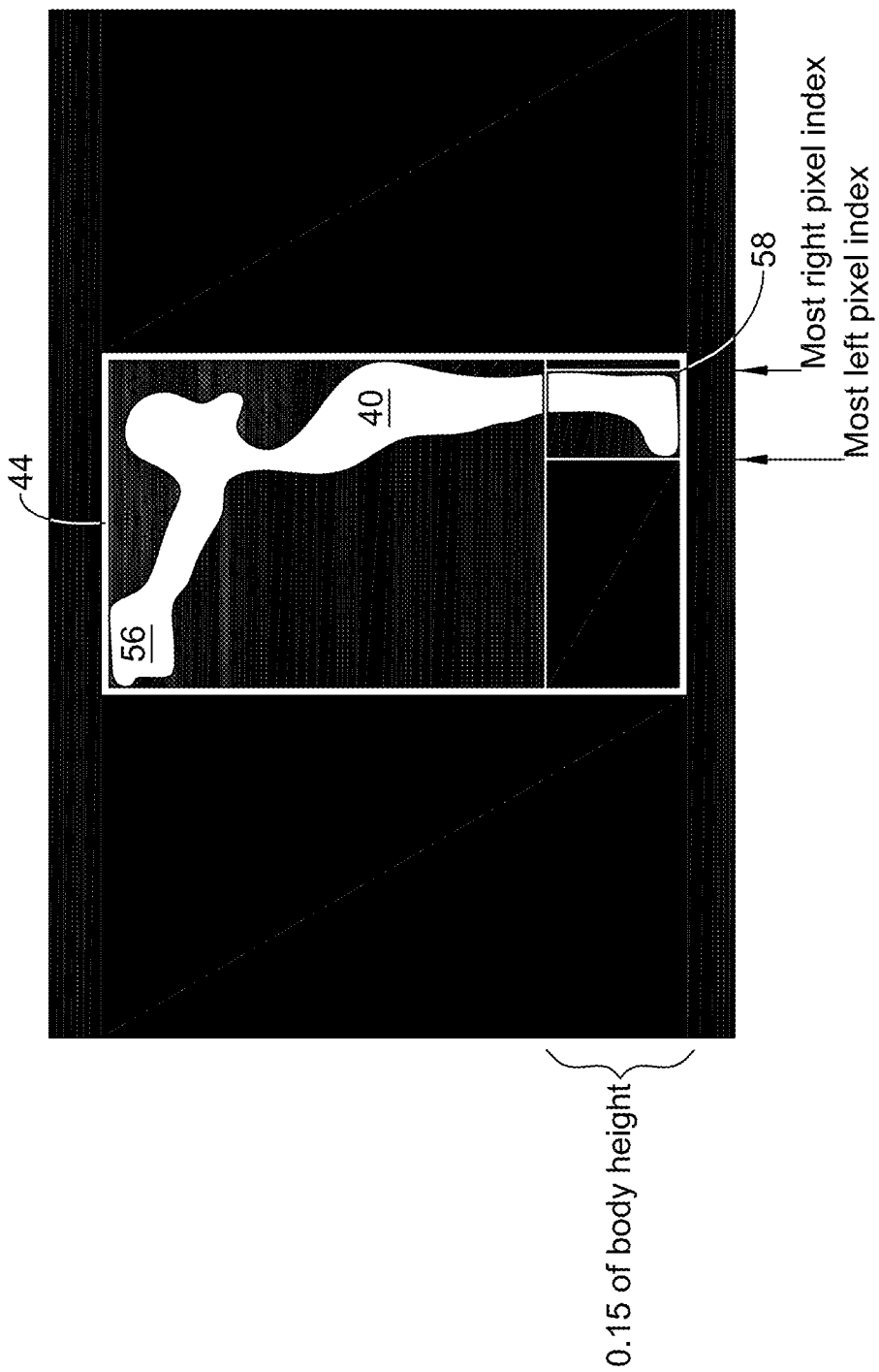
FIG. 13 is a schematic view of an illustrative segmented frame of video depicting a silhouette of a subject loading an object and in which a feet location of the subject is being determined.
Figure 14:
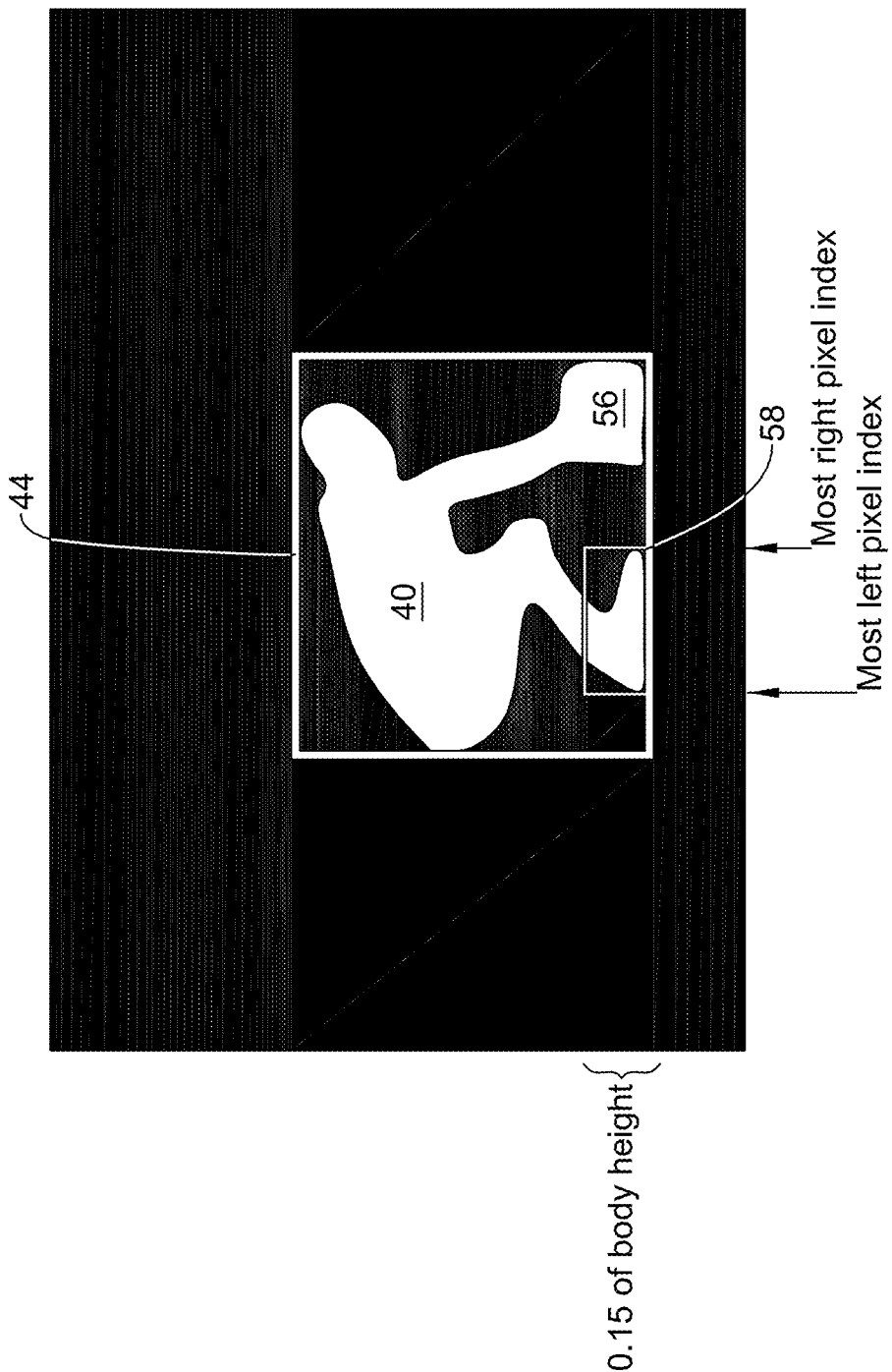
FIG. 14 is a schematic view of an illustrative segmented frame of video depicting a silhouette of a subject unloading an object and in which a feet location of the subject is being determined.

Before applying the above formula, however, the monitoring system 10 may need to determine a region of interest where the feet center may lie. This may be entered manually through a user interface or the monitoring system 10 may determine, on its own, the region of interest where the feet center lies. In one example, the monitoring system 10 may set the region of interest where the feet center lies as an area of the subject's feet and shanks (e.g., shins) as represented by the silhouette 40. FIGS. 13 and 14 depict the region of interest 58 of a silhouette 40 bounded with a bounding box 44 for determining a center of the feet when the silhouette 40 is beginning a task by loading an object represented by ghost effect 56 (FIG. 13) and when the silhouette 40 is ending a task by unloading the object represented by the ghost effect 56 (FIG. 14). The monitoring system 10 may then determine the mass center of this area using equation (3).

The shank and feet area (e.g., the region of interest) may be determined in any manner. In one example, a statistical method may be used to find the height of the shanks of the subject 2 as represented by the silhouette 40. For example, a shank height may be considered to be a percentage of a total height of the subject. In some cases, the shank height may be considered to be 0.10, 0.15, and/or other fraction of a height of the silhouette 40 of the subject 2. Thus, a vertical dimension of the region of interest where the feet center may lie may span from 0.15 of a height of the silhouette 40 of the subject 2 in the frame and a vertical dimension of the base of the bounding box 44. The horizontal dimension of the region of interest may span from a marginal pixel of the silhouette 40 in a x-positive direction (e.g., the most right pixel index) within the vertical dimension of the region of interest and a marginal pixel of the silhouette 40 in a x-negative direction (e.g., the most left pixel index) within the vertical dimension of the region of interest 58, as depicted in FIG. 13.

In the situation where the subject 2 may be squatting and working with an object 4 near the ground, as shown in FIG. 14, it is contemplated the hands of the silhouette 40 representing the subject 2 and/or the ghost effect 56 representing the object 4 may be located in the region of interest 58. To facilitate determining a horizontal location of the feet when the hands and/or the object are located in the region of interest 58, the region of interest 58 may be adjusted (e.g., horizontally reduced) based on a size of the object 4 as represented by the ghost effect 56. The size of the object 4 may be determined by multiplying a distance from the center of the ghost effect 56 (e.g., which may have been determined to locate the hands) to an edge of the bounding box 44 by two (2), as the outer edge of the object 4 may typically be considered a margin pixel defining an edge of the bounding box 44.

Once the region of interest 58 is identified, a distance between the hands and feet of the subject may be determined. The distance between the hands and feet of the subject may then be used to assess movement of the subject 2 in the video.

Although segmentation of frames of video facilitates identifying subjects 2 and objects 4 in video based on movement of the subjects 2 and/or objects 4 relative to a background, one limitation is that if one of the subjects 2 and/or objects 4 of interest, or portions thereof, stops moving for a set number of frames (e.g., a predetermined number of two or more frames, which may depend on a background update rate), that subject 2 and/or object 4, or portions thereof, may be absorbed into the background. As a result, features that are meant to be in the foreground and be identified or tracked may become background and untrackable. In one such instance, among others, feet may be stationary at one or more times while the subject 2 is performing a monitored task and thus, the feet may be absorbed into the background. Losing a location of the feet may be problematic because a useful measurement in monitoring the subject 2 performing a task is a horizontal and/or vertical distance between the subject's hands and feet, as discussed above. Additionally or alternatively, when the feet disappear from a foreground in segmented video, a bound around the subject 2 may change and the subject 2 may be assigned an inaccurate posture and/or other parameter measurements may be affected. Although the feet disappear from the silhouette 40 representing the subject 2 due to a lack of motion of the feet, temporal information and/or appearance information may be utilized to retrieve the feet and maintain the feet in the foreground when the feet are stationary.

To account for the situation when feet and/or other portions of a silhouette representing a subject disappear from the foreground when it is desirable for such portions of the silhouette to be in the foreground, a location of the feet and/or other portions of the subject may be identified by utilizing an estimation of the location of the feet. For example, a location of the feet and/or other portions of the subject in a previous frame and/or a function thereof may be added to and/or substituted into a current frame when the feet and/or other portions of the subject have disappeared from the foreground in the current frame. In some cases, Bayesian-based estimation may be utilized to ensure the foreground in each frame of video includes a silhouette of the feet of the subject. Although we discuss estimating locations of the feet of a subject, other portions of the subject may be located through estimation in a manner similar to as discussed herein with respect to the feet of the subject.

One example formula that may be used to estimate a location of the subject's feet is as follows:

$$\text{Posterior probability} = \text{prior probability} \times \text{likelihood} \quad (4)$$

where the prior probability term in equation (4) may be an estimated feet location of a silhouette 40 in a current frame of video based on a previous frame of video. In one example, the estimated feet location may be the location of the feet of the silhouette 40 (e.g., region of interest 58 or other location) in the previous frame or a different function of the location of the feet of the silhouette 40 in the previous frame. Because the feet may not move fast from frame-to-frame for a conventional video frame rate (e.g., a frame rate in a range from 15 frames per second (fps) to 30 fps), the difference between the feet location of a silhouette 40 in the current frame and that of the previous frame may be expected to be small (e.g., as measured in change of pixel locations from frame-to-frame), with an average of about zero (0) pixels. As such, a plausible location for a feet portion of the silhouette 40 in the current frame may be defined by a one or more pixels extending from the feet location of the silhouette 40 in a previous frame. As discussed above, the region of interest 58 may identify a plausible location of the feet of the subject 2 represented by the silhouette 40 in the current frame. This region of interest 58 may be the bottom 10% of the area covered by the bounding box of the previous frame (the area shares the same width and 0.1 of the height of the bounding box) or other suitable percentage of the area covered by the bounding box of the previous frame.

Figure 15:
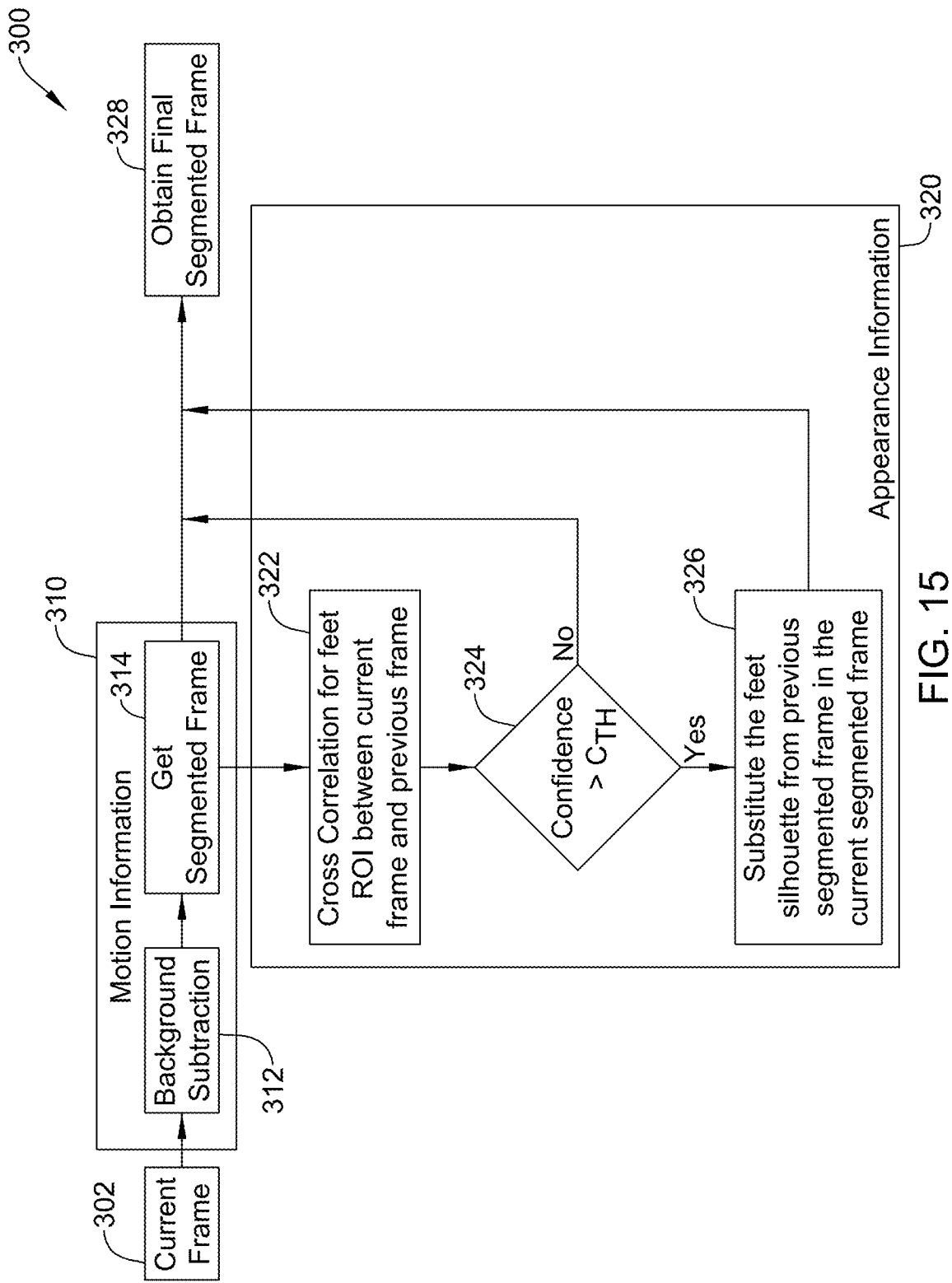
FIG. 15 is a schematic flow diagram of an illustrative method of representing portions of a subject in a frame of video.

The likelihood term in equation (4) may be provided by motion information and appearance information. In some cases, the motion information and the appearance information may be weighted relative to each other, but this is not required. In one example, the appearance information may have a greater weight (e.g., have a higher priority) than the motion information. To compare a current frame appearance in the region of interest 58 with a previous frame appearance within the region of interest 58 (e.g., where the previous frame appearance within the region of interest 58 may be from a frame immediate before the current frame, may be from a frame at X-number of frames before the current frame, may be an average of previous frame appearances within the region of interest 58 over X-number of frames, a rolling average of previous frame appearances within the region of interest 58 over X-number of frames, or other suitable previous frame appearance within the region of interest 58), a pixel-by-pixel intensity cross-correlation of the region of interest 58 of the current frame and of the region of interest 58 of the previous frame may be utilized. If a confidence value of the cross-correlation (e.g., a confidence level obtained as a direct result of the pixel-by-pixel intensity cross-correlation as compared to an expected result of the pixel-by-pixel intensity cross-correlation) goes beyond (e.g., is greater than, as depicted in FIG. 15, or less than) a pre-set confidence threshold (e.g., the pre-set threshold may be set as 0.85, 0.9, 0.95, and/or set at one or more other suitable threshold values), then the feet portion of the silhouette in the region of interest 58 of the current frame may be estimated to be the same as that of the previous frame and the region of interest 58 of the previous frame may be utilized for the region of interest 58 of the current frame. This happens when the feet of the subject are steady and the motion information is disregarded. If the confidence value of cross-correlation has not reached (e.g., is lower than, as depicted in FIG. 15, or is greater than) the pre-set confidence threshold, then the feet portion of the silhouette 40 in the region of interest 58 for the current frame may be utilized as the feet of the silhouette 40 in the current frame. This happens when the feet of the subject 2 are moving and motion information is considered.

The pixel-by-pixel intensity cross-correlation and confidence level determination of the region of interest 58 in different frames of video may be performed using digital image correlation and tracking (DIC) techniques and/or other suitable cross-correlation techniques. Although cross-correlation and the use of confidence levels is discussed herein for comparing the regions of interest 58 in a current frame and a previous frame of video to determine feet locations of the subject 2, other comparing techniques may be utilized to determine locations of feet of the subject 2 and/or locations of other features of the subject 2.

FIG. 15 depicts a flow diagram of an approach 300 for ensuring feet of the subject 2 appear in the silhouette 40 even when the subject's feet are or are substantially static or stationary across a predetermined number of frames. In the approach 300, a current frame may be provided for analysis and background subtraction. As shown in a motion information box 310, background subtraction may be performed 312 on the frame to obtain 314 a segmented frame, including a region of interest 58 for the feet of the subject 2 represented by the silhouette 40. As shown in an appearance information box 320, a cross-correlation for the region of interest 58 in the segmented frame of the current frame and the region of interest 58 in a segmented frame of a previous frame may be obtained and a confidence level in the correlation may be determined and compared 324 to a confidence level threshold $C_{TH}$. In the case depicted in FIG. 15, the confidence level in the cross-correlation may be determined by comparing the result of the cross-correlation to an expected cross-correlation indicating the feet of the subject 2 as represented by the silhouette 40 have disappeared from the foreground in the current frame, but other arrangements for determining a confidence level are contemplated. When the determined confidence level has gone beyond (e.g., is greater than) the confidence level threshold $C_{TH}$, the region of interest 58 and/or a portion of the silhouette 40 within the region of interest 58 of the segmented previous frame may be substituted 326 into the segmented current frame and the final segmented frame may be obtained 328. When the determined confidence level has not gone beyond (e.g., is equal to or less than) the confidence level threshold $C_{TH}$, the region of interest 58 in the segmented current frame may be the obtained 328 final segmented frame. This technique for ensuring that stationary feet of the subject 2 appearing in a segmented frame when the feet have not moved or have not moved a threshold amount over a predetermined number of frames is an example technique, and other techniques are contemplated.

Figure 16:
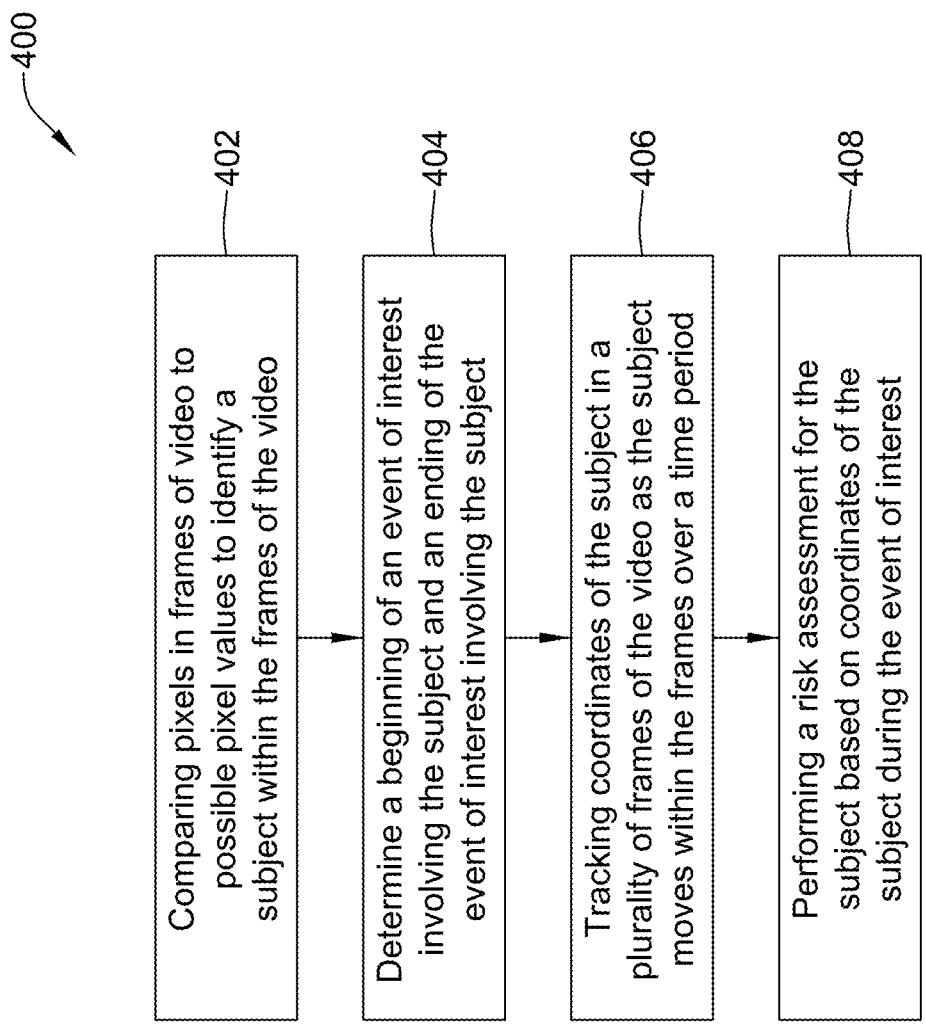
FIG. 16 is a schematic flow diagram of an illustrative method of performing a risk assessment.

FIG. 16 is an approach 400 utilizing the monitoring system 10 to assess movement of a subject during an event of interest (e.g., a lifting task or other event of interest). Although not shown, the approach may include receiving a video including an event of interest. The monitoring system 10 (e.g., a non-transitory computer readable medium having instructions stored thereon to perform the techniques discussed herein) may compare 402 pixels in frames of video to possible pixel values based on an identified distribution to identify a subject within the frames of the video. As discussed above, the monitoring system 10 may compare successive frames of the video by comparing corresponding pixels of the successive frames and/or by comparing the frames in one or more other manners. Once the subject has been identified, a beginning of an event of interest and an ending of the event of interest may be determined 404 (e.g., by identifying ghost effects and/or with one or more other techniques). The event of interest may be any event involving the subject. In some cases, the event of interest may be a lifting task that is repeated over time. The techniques discussed herein and/or other techniques may be utilized to determine a beginning and/or an ending of an event of interest. One or more coordinates (e.g., marginal pixels, center of pixel mass, etc.) of a subject within a frame may be tracked 406 through a plurality of frames of the video as the subject moves within the frames over a period of time from the beginning of the event of interest and the end of the event of interest. When the event of interest involves a lifting task, the subject may be tracked from a location at which an object is picked up (e.g., loaded) until a location at which the object is set down (e.g., unloaded). Further, if the event of interest is repeated, the subject may be tracked while the event of interest is repeated. Then, based on coordinates of the subject during the event of interest and extracted information (as discussed herein) based on the identified coordinates, the monitoring system 10 may perform 408 an assessment of movement of the subject during the event of interest.

In some cases, the monitoring system 10 may identify or extract parameter values from the video including, but not limited to, frequency (e.g., from the horizontal location tracking), speed (e.g., an amount of time between a beginning of an event and an end of the event), acceleration, and/or other parameter of the subject during the event of interest. Based on these parameters, posture, distance between hands and feet of the subject, and/or other parameters, the monitoring system 10 may determine a recommended weight limit, a lifting index, and/or perform one or more other assessments of movements of the subject during the event of interest. The monitoring system may then provide an output (e.g., an alert, report, etc.) in response to the assessment and/or save the assessment to memory. Further, the monitoring system 10 may be configured to capture and/or receive video in real time during an event of interest and perform real time processing and/or assessments, in accordance with the approach 400 and as discussed herein, with the goal of preventing injuries and/or mitigating risks during the event of interest.

Further, during the process of the monitoring system 10 processing the video, the video may be converted to frames similar to as depicted in FIGS. 6, 7, 10A-10E, 12, and 13, where the background and the foreground have been distinguished, and displayed on a display (e.g., the display 30 or other display) for observation while the monitoring system analyzes the video. Alternatively, the original video may be displayed and the comparison of corresponding pixels in successive frames may be done in a process that is not displayed. Further, one or more of the bounding step and the hand location step (e.g., marking of an identified center of the hands) may be depicted on a display even if the comparison of corresponding pixels in successive frames is not depicted in a manner similar to what is depicted in FIGS. 6, 7, 10A-10E, 12, and 13, but rather the original video is displayed if any video is displayed. In some cases, the monitoring system 10 may output via the output port 22 assessments and/or alerts based on assessments without displaying a portion of, or any portion of, an analysis of the video.

Although the monitoring system 10 is discussed in view of manual lifting tasks, similar disclosed concepts may be utilized for other tasks involving movement. Example tasks may include, but are not limited to, manual lifting, sorting, typing, performing surgery, throwing a ball, etc. Additionally, the concepts disclosed herein may apply to analyzing movement of people, other animals, machines, and/or other devices.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A marker-less subject tracking system comprising:
an input port for receiving a digital video of a subject;
a controller in communication with the input port, the controller is configured to:
determine a height of the subject in a frame from the digital video;
determine a width of the subject in the frame;
determine a posture of the subject in the frame based on a normalized height value of the subject in the frame and a normalized width value of the subject in the frame; and
wherein the height of the subject in the frame and the width of the subject in the frame are normalized based on a normalizer to determine the normalized height value of the subject in the frame and the normalized width value of the subject in the frame.

2. The system of claim 1, wherein the controller is configured to automatically determine postures of the subject in real time during playback of the digital video.

3. The system of claim 1, wherein the normalizer is a standing height of the subject.

4. The system of claim 1, wherein the controller is configured to use a decision tree model to determine the posture of the subject in the digital video based on the normalized height value of the subject and the normalized width value of the subject determined from the digital video.

5. The system of claim 1, wherein the determined posture is selected from a group consisting of a standing posture, a stooping posture, and a squatting posture.

6. The system of claim 1, wherein to determine the posture of the subject in the frame, the controller is configured to:
compare a value based on the height of the subject in the frame to one or both of a first height threshold value and a second height threshold value; and compare a value based on the width of the subject in the frame to one or both of a first width threshold value and a second width threshold value.

7. The system of claim 1, wherein the controller is configured to determine the height of the subject and the width of the subject in the digital video using pixel information in the digital video.

8. The system of claim 1, wherein the controller is configured to:
apply a bounding box around the subject in the digital video;
assign a height of the bounding box as the height of the subject; and
assign a width of the bounding box as the width of the subject.

9. The system of claim 8, wherein the controller is configured to:
determine extreme-most pixels in two dimensions of the subject; and
the bounding box intersects the determined extreme-most pixels in the two dimensions of the subject.

10. The system of claim 1, wherein the controller is configured to:
determine extreme-most pixels in a first dimension of the subject and assign a distance between the extreme-most pixels in the first dimension as the height of the subject; and
determine extreme-most pixels in a second dimension of the subject and assign a distance between the extreme-most pixels in the second dimension as the width of the subject.

11. A computer readable medium having stored thereon in a non-transitory state a program code for use by a computing device, the program code causing the computing device to execute a method for determining a posture of a subject in video comprising:
identifying a subject within a frame of video;
determining a height of the subject within the frame of the video;
determining a width of the subject within the frame of the video;
determining a first value based on the height of the subject in the frame by normalizing the height of the subject in the frame with a normalizer;
determining a second value based on the width of the subject in the frame by normalizing the width of the subject in the frame with the normalizer;
comparing the first value based on the height of the subject to at least a first threshold value and comparing the second value based on a width of the subject to at least a second threshold value; and
determining a posture of the subject within the frame of the video based on one or both of the comparing the first value based on the height of the subject to the first threshold value and the comparing the second value based on a width of the subject to the second threshold value.

12. The computer readable medium of claim 11, wherein the normalizer is a standing height of the subject.

13. The computer readable medium of claim 11, wherein the determined posture is selected from a group consisting of a standing posture, a stooping posture, and a squatting posture.

14. The computer readable medium of claim 11, wherein:
comparing the first value based on the height of the subject to at least a first threshold value includes comparing the first value based on the height of the subject to a first height threshold value; and
determining the posture of the subject within the frame of the video includes when the first value based on the height of the subject has reached or gone beyond the first height threshold value, determining the subject is in a standing posture.

15. The computer readable medium of claim 14, wherein:
comparing the first value based on the height of the subject to at least a first threshold value includes comparing the first value based on the height of the subject to a second height threshold value; and
determining the posture of the subject within the frame of the video includes when the first value based on the height of the subject has not reached or gone beyond the first height threshold value and when the first value based on the height of the subject has not reached or gone beyond the second height threshold value, determining the subject is in a squatting posture.

16. The computer readable medium of claim 15, wherein:
comparing the second value based on the width of the subject to at least a second threshold value includes comparing the second value based on the width of the subject to a first width threshold value; and
determining the posture of the subject within the frame of the video includes when the first value based on the height of the subject has not reached or gone beyond the first height threshold value and has reached or gone beyond the second height threshold value and when the second value based on the width of the subject has reached or gone beyond the first width threshold value, determining the subject is in a stooping posture.

17. The computer readable medium of claim 16, wherein:
comparing the second value based on the width of the subject to at least a second threshold value includes comparing the second value based on the width of the subject to a second width threshold value;
determining the posture of the subject within the frame of the video further comprises wherein when the first value based on the height of the subject has not reached or gone beyond the first height threshold value and has reached or gone beyond the second height threshold value and the second value based on the width of the subject has not reached or gone beyond the first width threshold and:
when the second value based on the width of the subject has reached or gone beyond the second width threshold value, determining the subject is in a standing posture; and
when the second value based on the width of the subject has not reached or gone beyond the second width threshold value, determining the subject is in a squatting posture.

18. The computer readable medium of claim 11, further comprising:
applying a bounding box around the subject within the frame of the video;
determining the height of the subject within the frame of the video based on a height of the applied bounding box; and
determining the width of the subject with the frame of the video based on a width of the applied bounding box.

19. A tracking system comprising:
a processor;
memory in communication with the processor, the memory includes instructions executable by the processor to:

analyze pixel information in a video;
determine a first value based on a height of a subject in the video by normalizing the height of the subject in the video with a normalizer;
determine a second value based on a width of the subject in the video by normalizing the width of the subject in the video with the normalizer;
compare the first value to one or more height threshold values;
compare the second value to one or more width threshold values; and
determine a parameter of the subject in the video using the comparison of the first value to the one or more height threshold values and the comparison of the second value to the one or more width threshold values.

20. The tracking system of claim 19, wherein to analyze pixel information in the video, the processor and memory are configured to:
determine extreme-most pixels in a first dimensions of the subject and assign a distance between the extreme-most pixels in the first dimension as a height of the subject; and
determine extreme-most pixels in a second dimension of the subject and assign a distance between the extreme-most pixels in the second dimension as a width of the subject.

21. A marker-less subject tracking system comprising:
an input port for receiving a digital video of a subject;
a controller in communication with the input port, the controller is configured to:
determine a height of the subject in a frame from the digital video by determining extreme-most pixels in a first dimension of the subject and assigning a distance between the extreme-most pixels in the first dimension as the height of the subject;
determine a width of the subject in the frame by determining extreme-most pixels in a second dimension of the subject and assigning a distance between the extreme-most pixels in the second dimension as the width of the subject;
determine a posture of the subject in the frame based on the height of the subject in the frame and the width of the subject in the frame.

22. A tracking system comprising:
a processor;
memory in communication with the processor, the memory includes instructions executable by the processor to:
analyze pixel information in a video;
compare a value based on a height of a subject in the video to one or more height threshold values;
compare a value based on a width of a subject in the video to one or more width threshold values; and
determine a parameter of the subject in the video using the comparison of the value based on the height of the subject in the video to one or more height threshold values and the comparison of the value based on the width of the subject in the video to one or more width threshold values; and
wherein to analyze pixel information in the video, the processor and memory are configured to:
determine extreme-most pixels in a first dimensions of the subject and assign a distance between the extreme-most pixels in the first dimension as the height of the subject; and
determine extreme-most pixels in a second dimension of the subject and assign a distance between the extreme-most pixels in the second dimension as the width of the subject.

* * * * *